(12) United States Patent
Naren et al.

(10) Patent No.: US 11,755,829 B1
(45) Date of Patent: Sep. 12, 2023

(54) ENHANCED SPREADSHEET PRESENTATION USING SPOTLIGHTING AND ENHANCED SPREADSHEET COLLABORATION USING LIVE TYPING

(71) Applicant: Microsoft Technology Licensing, LLC, Redmond, WA (US)

(72) Inventors: Meenakshi Naren, Hyderabad (IN); Vinay Vishwanath, Bidar (IN); Shashank Kapoor, Jagatganj (IN); Shravani Dilip Agarkar, Maharashtra (IN); Karthik Kasoju, Telangana (IN); Sandeep Choudri, Hyderabad (IN); Naresh Jain, Hyderabad (IN); Tumu Sree Bharath, Hyderabad (IN); Brian M. Jones, Seattle, WA (US); Jeet Mukeshkumar Patel, Gujarat (IN); Sameer Desai, Bidar (IN); Shashank Gupta, Kanpur (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/858,360

(22) Filed: Jul. 6, 2022

(51) Int. Cl.
  *G06F 40/18* (2020.01)
  *G06F 40/197* (2020.01)
  *G06F 3/0482* (2013.01)

(52) U.S. Cl.
  CPC ............ *G06F 40/18* (2020.01); *G06F 3/0482* (2013.01); *G06F 40/197* (2020.01); *G06F 2203/04804* (2013.01); *G06F 2203/04806* (2013.01)

(58) Field of Classification Search
  CPC ...... G06F 40/18; G06F 3/0482; G06F 40/197; G06F 2203/04804; G06F 2203/04806
  See application file for complete search history.

(56) References Cited

U.S. PATENT DOCUMENTS

| 8,321,780 | B2 | 11/2012 | Erwig et al. | |
| 8,959,423 | B2* | 2/2015 | Hammoud | G06F 3/04812 |
| | | | | 715/205 |
| 9,032,298 | B2* | 5/2015 | Segal | G06Q 30/06 |
| | | | | 715/723 |
| 9,158,746 | B2 | 10/2015 | Bartek et al. | |
| 9,377,862 | B2* | 6/2016 | Parkinson | G06F 3/012 |
| 9,792,017 | B1* | 10/2017 | Landefeld | G06T 19/00 |

(Continued)

OTHER PUBLICATIONS

"Get All Hands on the Grid", Retrieved from: https://www.zoho.com/sheet/collaboration.html, Retrieved Date: Mar. 11, 2022, 6 Pages.

(Continued)

*Primary Examiner* — Hien L Duong
(74) *Attorney, Agent, or Firm* — Schwegman Lundberg & Woessner, P.A.

(57) ABSTRACT

A computer implemented method includes accessing a spreadsheet for display on a display screen during a remote meeting, receiving a first selection to execute a spotlight function, receiving a second selection of a portion of the spreadsheet being displayed, creating an overlay via the spotlight function, the overlay having a transparent cavity corresponding to the selected portion of the spreadsheet, and applying the overlay to the spreadsheet being displayed such that the selected portion is visible and other portions of the spreadsheet are obscured.

20 Claims, 19 Drawing Sheets

(56) References Cited

U.S. PATENT DOCUMENTS

| | | | |
|---|---|---|---|
| 10,007,734 B2 | 6/2018 | Burns et al. | |
| 10,140,269 B2* | 11/2018 | Vogel | G06F 40/197 |
| 10,460,260 B2 | 10/2019 | Yip | |
| 2003/0105816 A1 | 6/2003 | Goswami | |
| 2006/0061597 A1* | 3/2006 | Hui | G06F 3/0481 |
| | | | 345/629 |
| 2007/0299710 A1 | 12/2007 | Haveliwala | |
| 2013/0145244 A1* | 6/2013 | Rothschiller | G06F 40/18 |
| | | | 715/212 |
| 2014/0109004 A1* | 4/2014 | Sadhvani | G06F 3/04883 |
| | | | 715/810 |
| 2014/0282230 A1* | 9/2014 | Sorin | G06F 3/0484 |
| | | | 715/790 |
| 2014/0372852 A1* | 12/2014 | Rothschiller | G06F 40/106 |
| | | | 715/212 |
| 2014/0372858 A1* | 12/2014 | Campbell | G06F 40/18 |
| | | | 715/220 |
| 2015/0169530 A1* | 6/2015 | Otero | G06F 40/106 |
| | | | 715/219 |
| 2015/0169532 A1* | 6/2015 | Otero | G06F 40/18 |
| | | | 715/212 |
| 2015/0286333 A1* | 10/2015 | Shey | G06F 3/0488 |
| | | | 345/173 |
| 2015/0293650 A1 | 10/2015 | Dukhovny | |
| 2016/0041963 A1* | 2/2016 | Coblenz | G06F 40/18 |
| | | | 715/227 |
| 2016/0098409 A1* | 4/2016 | Burke | G06F 3/0482 |
| | | | 707/722 |
| 2018/0046608 A1* | 2/2018 | Yousaf | G06F 40/18 |
| 2018/0088753 A1* | 3/2018 | Viégas | G06F 40/216 |
| 2018/0176965 A1* | 6/2018 | Mathias | G06F 3/02 |
| 2020/0326841 A1* | 10/2020 | Griffin | G06T 11/60 |
| 2021/0286510 A1* | 9/2021 | Tyler | G06F 3/04883 |
| 2021/0397420 A1* | 12/2021 | Stachura | G06F 8/30 |
| 2022/0067220 A1* | 3/2022 | Yao | G06F 3/013 |

OTHER PUBLICATIONS

"Making the Most of Real Time Editing", Retrieved from: https://experience.dropbox.com/resources/real-time-editing, Retrieved Date: Mar. 11, 2022, 8 Pages.

"Workbook Operations", Retrieved from: https://docs.automationanywhere.com/bundle/enterprise-v2019/page/enterprise-cloud/topics/aae-client/bot-creator/commands/cloud-excel-workbook-operations.html, Retrieved Date: Mar. 11, 2022, 6 Pages.

* cited by examiner

| | A | B | C | D | E | F | G | H | I | J | K | L | M | N |
|---|---|---|---|---|---|---|---|---|---|---|---|---|---|---|
| 1 | | | | | | | | | | | | | | |
| 2 | PRODUCT KEY | (All) | | | | | | | | | | | | |
| 3 | | | | | | | | | | | | | | |
| 4 | SUM OF SALES | | COLOR | | | | | | | | | | | |
| 5 | CATEGORY | SUBCATEGORY | BLACK | GREY | BLUE | MULTI | NA | RED | SILVER | BLACK YELLOW | WHITE | SILVER | GRAND TOTAL | |
| 6 | ACCESSORIES | | 3,900 | 131 | 2,681 | | 24,273 | 2,099 | | | | 1,704 | 34,788 | |
| 7 | | BIKE RACKS | | | | | 164 | | | | | | 164 | |
| 8 | | BIKE STANDS | | | | | 922 | | | | | | 922 | |
| 9 | | BOTTLES AND CAGES | | | | | 3,858 | | | | | | 3,858 | |
| 10 | | CLEANERS | | | | | 262 | | | | | | 262 | |
| 11 | | FENDERS | | | | | 1,209 | | | | | | 1,209 | |
| 12 | | HELMETS | 3,900 | | 2,681 | | | 2,099 | | | | | 8,680 | |
| 13 | | HYDRATION PACKS | | | | | | | | | | 1,704 | 1,704 | |
| 14 | | LIGHTS | | | | | 4,274 | | | | | | 4,274 | |
| 15 | | LOCKS | | | | | 381 | | | | | | 381 | |
| 16 | | PANNIERS | | 131 | | | | | | | | | 131 | |
| 17 | | PUMPS | | | | | 2,044 | | | | | | 2,044 | |
| 18 | | TIRES AND TUBES | | | | | 11,159 | | | | | | 11,159 | |
| 19 | BIKES | | 46,252 | 6,257 | | | | 25,521 | | 27,190 | 16,874 | | 39,312 | |
| 20 | | MOUNTAIN BIKES | 22,438 | | | | | | | | 16,874 | | 39,312 | |
| 21 | | ROAD BIKES | 23,814 | 6,257 | | | | 25,521 | | | | | 64,338 | |
| 22 | | TOURING BIKES | | | | | | | | 18,444 | | | 18,444 | |
| 23 | CLOTHING | | 17,806 | 3,097 | 18,695 | | | 3,379 | 1,858 | | | | 44,835 | |
| 24 | | BIB-SHORTS | | | 1,154 | | | | | | | | 1,209 | |
| 25 | | CAPS | | | 5,179 | | | 3,379 | | | | | 8,680 | |
| 26 | | GLOVES | 7,245 | | 12,362 | | | | | | | | 1,704 | |
| 27 | | JERSEYS | | | | | | 3,379 | 1,858 | | | | 4,774 | |
| 28 | | SHORTS | 7,491 | | | | | | | | | | 381 | |
| 29 | | SOCKS | | | | | | | | | | 1,858 | 131 | |

*FIG. 4*

| | MEETING CONTEXT | | | | |
|---|---|---|---|---|---|
| | TIME/DATE | CELL | PREVIOUS VALUE | NEW VALUE | USER |
| | 0830.21 2-3-2022 | 1A | 22 | 46 | USER 2 |
| | ⋮ | ⋮ | ⋮ | ⋮ | ⋮ |

ENHANCED SPREADSHEET PRESENTATION USING SPOTLIGHTING AND ENHANCED SPREADSHEET COLLABORATION USING LIVE TYPING

BACKGROUND

Current spreadsheet applications may have limited functionality for presentations during meetings. Spreadsheet apps are not designed with functions that support presentation needs and scenarios during meetings. For example, it is difficult to present a portion of the spreadsheet during a meeting. It can also be cumbersome to walk through multiple aspects of a workbook in a logical sequence to make a point. There are solutions to get around these, such as cutting and pasting images of the spreadsheet for presentation. But these solutions are time-consuming and not ideal.

SUMMARY

A computer implemented method includes accessing a spreadsheet for display on a display screen during a remote meeting, receiving a first selection to execute a spotlight function, receiving a second selection of a portion of the spreadsheet being displayed, creating an overlay via the spotlight function, the overlay having a transparent cavity corresponding to the selected portion of the spreadsheet, and applying the overlay to the spreadsheet being displayed such that the selected portion is visible and other portions of the spreadsheet are obscured.

BRIEF DESCRIPTION OF THE DRAWINGS

FIG. 4 is a screenshot of an example spotlighted view of a spreadsheet showing a spotlighted portion of the spreadsheet according to an example embodiment.

DETAILED DESCRIPTION

Figure 1:
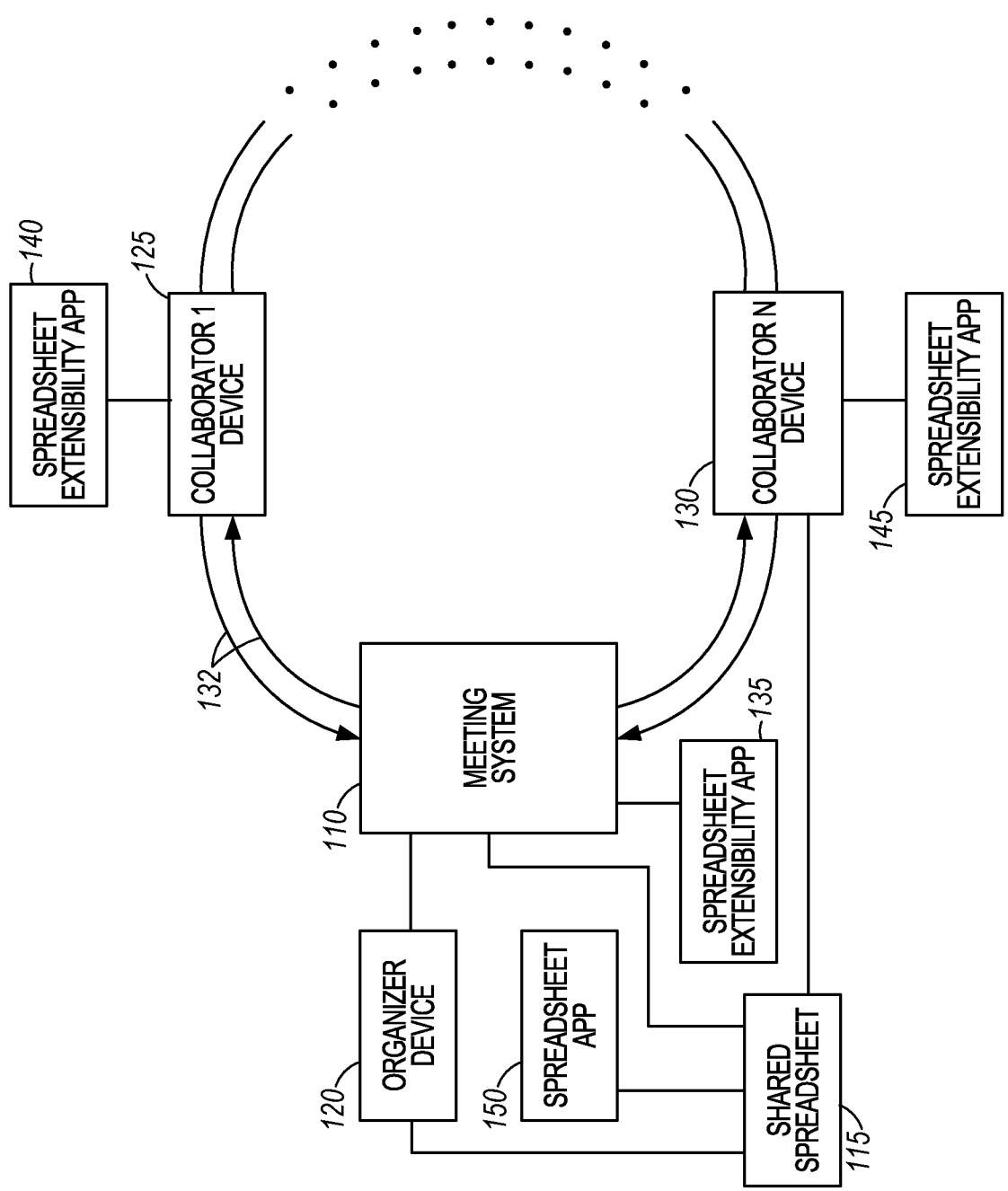
FIG. 1 is a block diagram of a system that provides one or more tools for collaboration on cloud-based spreadsheets and screen enhanced sharing during virtual meetings and presentations according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Spreadsheet applications are not designed for facilitating presentation of information while sharing a view within a spreadsheet being displayed. It is difficult to present and call attention to just a portion of the spreadsheet being displayed during the meeting. It is also difficult to walk through multiple aspects of a workbook in a logical sequence to make a point. There are solutions to get around these difficulties, such as cutting and pasting images of the spreadsheet for presentation. But these solutions are time-consuming and not ideal. Cutting and pasting images into a presentation format makes it difficult to ensure latest information is being presented and prevent real time collaboration and editing of the underlying spreadsheet.

Various improvements to enable presenting information being displayed by a spreadsheet application while sharing content in a meeting during virtual meeting include providing a spotlight mode that focuses on a portion of the spreadsheet. A storyboarding feature enables multiple selected views of portions of a workbook that include a sequence of views referred to as a presentation flow. The sequence of views can be created prior to a meeting, at the start of a meeting, or during the meeting to ensure desired meeting outcomes are achieved. The presentation flow may be displayed as a ribbon with links, such as previews, to the views. The ribbon provides a view of the presentation flow while displaying the workbook and allows easy navigation within the workbook to the corresponding views.

Each device in the virtual meeting that receive a view of workbook loaded on their screen may utilize a selectable zoom level to optimize visibility of the information for the size of the device's display along with maintaining context of the sharer/presenter. Each device may enable scrolling within a zoomed view to enable user selectable viewing of the entirety of the shared screen, albeit not all at the same time. Optimized zoom is available at the beginning and during the entire meeting. Optimized view may provide a proportionate zoom level that may vary between the sharer/presenter and all other participants in the meeting.

Further improvements include the ability to manage changes in the presented workbook that were made during presentation using a data structure corresponding to the presented portions of a workbook in a private lobby associated with the meeting and merging changes of that data structure into the underlying workbook.

Real-time editing of the spreadsheet may be displayed to all meeting attendees during the meeting. Changes to text made during the meeting may be mirrored as the text is being typed by other participants prior to the user typing committing the changes to a cell in the spreadsheet. All participants connected to a common channel may see the updates by sharing persistent and non-persistent updates. A digest of all changes to the spreadsheet made during the meeting may be generated to identify the changes made with attribution.

One or more of the above improvements can help in various meeting and presentation environments. Formal pre-planned meetings, where a presenter drives a meeting and the audience follows, can benefit from at least the storyboarding feature. Such meetings typically involve client meetings and leadership meetings that are either in person or virtual.

Informal meetings may have a semi structured flow where a presenter presents, and the audience contributes. Review meetings, updates, and other meetings can benefit from several of the above improvements. The spotlight feature may be used to focus the group on a selection of rows and columns. The storyboarding feature can be used to help organize the flow of a presentation.

Collaborative meetings, such as interactive work sessions between a group of people, may also benefit from one or more of the above improvements. Spotlighting and storyboarding provide benefits in the same manner as in informal meetings. The ability to allow multiple attendees to modify a collaborative workbook, view changes in real time, and keep track of the changes can also be beneficial. Optimized viewing can help attendees in multiple different types of meetings.

FIG. 1 is a block diagram of a system 100 that provides one or more tools for collaboration on cloud-based spreadsheets and screen enhanced sharing during virtual meetings and presentations. System 100 utilizes a meeting system, such as Microsoft® Teams® meeting platform 110 to facilitate virtual meetings and presentations. A cloud-based file sharing system 115 may be used to share a spreadsheet workbook among multiple collaborators.

In one example, an organizer utilizes an organizer device 120 in conjunction with meeting system 110 to arrange a meeting between a meeting set of collaborators that includes organizer device 120, a first collaborator device 125 and a second collaborator device 130. Each of the collaborators may also have access to the shared spreadsheet in file sharing system 115. The meeting system is coupled to share audio and video as well as messages between each of the collaborators. In addition, a real-time channel (RTC) 132 via websockets may be used to communicate messages that include changes as described in further detail below.

In one example each collaborator may use their respective devices to access the shared spreadsheet in file sharing system 115 that includes functions for collaboratively editing the spreadsheet.

Multiple tools to facilitate presenting, sharing, and collaborating may be provided by a spreadsheet extensibility application indicated at 135, 140 and 145 respectively. The spreadsheet extensibility application may be accessible by each of the collaborators directly or via the meeting system 110 and may be used to host a spreadsheet app to open a shared spreadsheet on each device 120, 125, 130 to facilitate sharing. The spreadsheet apps provide the ability to extend the capabilities of spreadsheet applications without rewriting or significantly modifying the spreadsheet applications. The spreadsheet apps may also be used to extend the capabilities of meeting system 110 by coordinating display of local copies on the spreadsheet on each device.

In one example, the tools may be integrated into spreadsheet application 150 accessible by organizer device 120. Spreadsheet application 150 may be used to directly edit a locally stored spreadsheet for use during presentations. Organizer device 120 may also present and collaborate using the shared spreadsheet, either directly from file sharing system 115 or via meeting system 110 accessing the shared spreadsheet.

Figure 2:
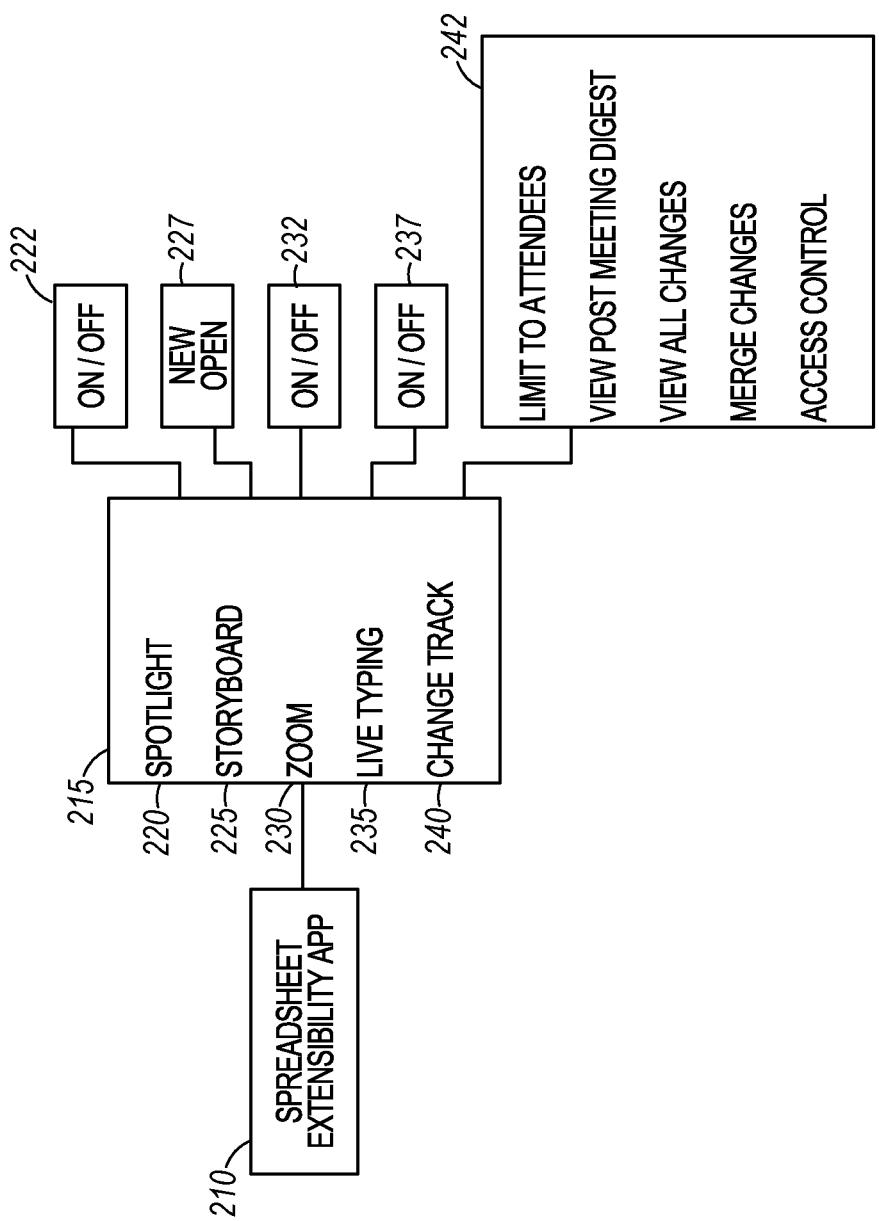
FIG. 2 is a diagram illustrating a user interface to a spreadsheet extensibility app according to an example embodiment.

FIG. 2 is a diagram illustrating a user interface 200 to a spreadsheet extensibility app 210. A viewable list of functions 215 may be selected by a user and include a spotlight function 220 which may be selected as on or off. A storyboard function 225 may include options 227 of new and open. A zoom function 230 may include options 232 of on and off as well as numerical values, such as 100%, 75%, 50%, etc. A live typing function 235 may include options 237 of on and off or may be enabled by default so attendees can see mirrored text on their displays.

A change tracking function 240 may include several options 242. Options 242 may include limiting the tracking to attendees of a meeting, viewing a post meeting digest that itemizes the changes and provide attribution for each change. A further option allows viewing all changes made by collaborators not in the meeting. A merge option allows merging of changes from different sets of collaborators. An access control option allows limiting the ability to make changes during a meeting to only those in the meeting or to one or more collaborators whether in the meeting or otherwise.

Functions 215 provide enhanced abilities to present and collaborate on information. In one example, functions 215 are part of an extension to a spreadsheet application. Having a separate extension allows for easy implementation during collaboration without having to change spreadsheet functionality of the file sharing system. The separate extension allows working with multiple different spreadsheet applications that may or may not support all the functions 215. One or more of the functions may also be integrated into spreadsheet applications in further examples.

Many of the functions 215 may be used during presentations where content is being shared between collaborators in the meeting. Some of the functions may be used during collaboration directly on a shared spreadsheet. Multiple functions may be used at the same time. Some of the functions are best used prior to a presentation to help select and organize presentation materials.

Figure 3:
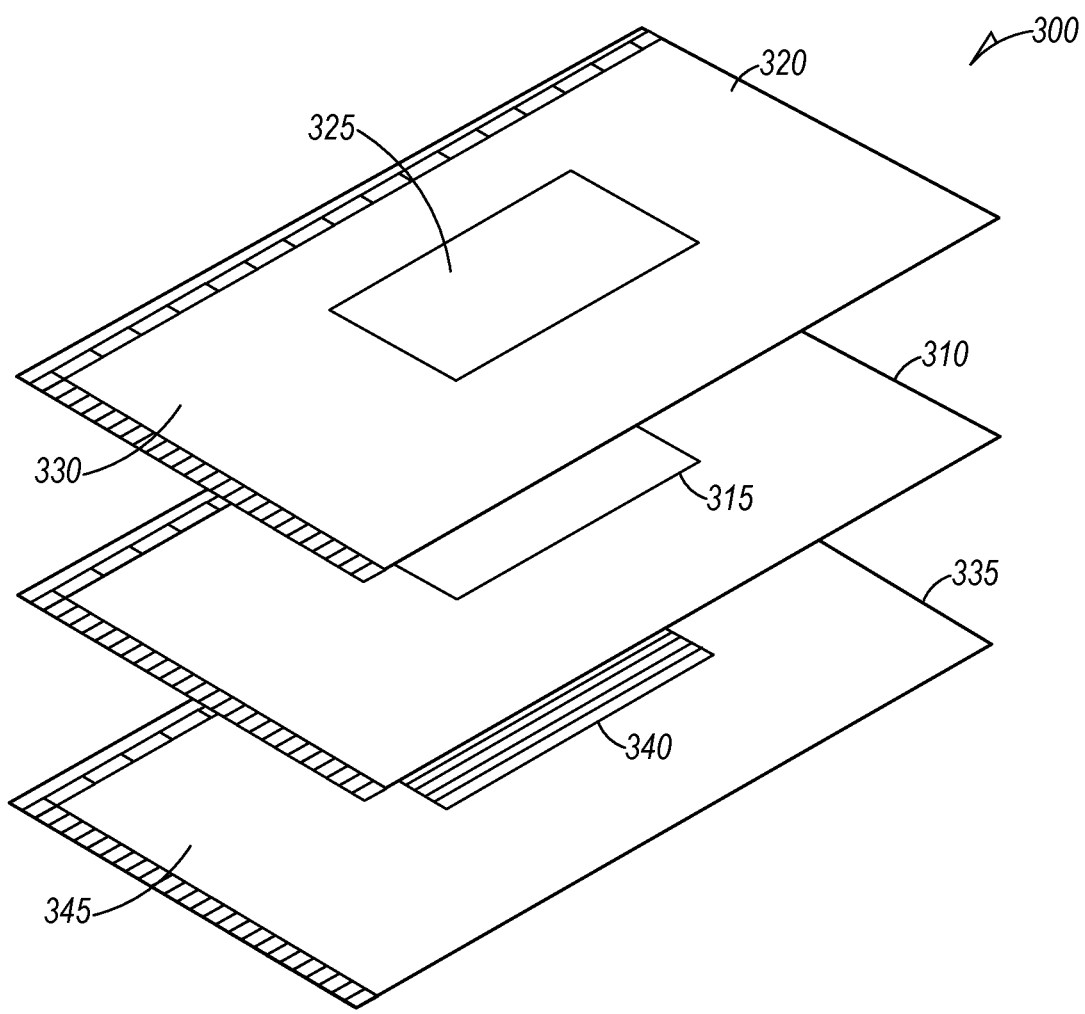
FIG. 3 is an exploded perspective diagram illustrating use of a spotlight function according to an example embodiment.

FIG. 3 is an exploded perspective diagram illustrating use of a spotlight function generally at 300. The spotlight function 300 may be selected from functions 215 and used on a spreadsheet 310 to select a portion 315 of the spreadsheet such as by manipulating a cursor. The portion 315 may be a selected grid of rows and columns, or even an object, such as a chart or image, that a presenter wishes to draw attention to during a presentation where the presenter is sharing content during a meeting. When selecting the portion, the user may double click in one corner and drag the cursor to another corner to highlight the desired portion.

Selection of the portion is used to create an overlay 320 with a cavity 325 or open portion that is transparent. The cavity corresponds to and matches the selected portion of the spreadsheet 310. The overlay is shown with the cavity matching row numbers and column letters corresponding to the selected portion 325 reproduced and highlighted in one example. Portions 330 of the overlay 320 outside the cavity 325 may be semitransparent to opaque.

The overlay 320 is layered on top of the spreadsheet 310 for display of a presentation view 335 of the spreadsheet to be shared via sharing content in a meeting. The presentation view 335 shows the selected portion 315 at 340 in an unobscured manner. The portions 345 of the presentation view 335 of the spreadsheet 310 are obscured by the portion 330 of the overlay 320 outside the cavity 325. The obscuring may be partial in the case of the overlay portion 330 being semitransparent, or complete in the case of an opaque portion 330. The row and column labels may also be visible either due to the overlay 320 including them, or by the underlying spreadsheet 310 not having the labels obscured by the overlay 320. In one example, the portion 330 may be a shading, such as grey, that is applied to increase the contrast between the portion 330 and the selected portion 315 in the presentation view 335.

FIG. 4 is a screenshot of an example spotlighted view 400 of a spreadsheet showing a spotlighted portion 410 of the spreadsheet. Portion 410 comprises the intersection of rows 18-25 and columns E-M of the spreadsheet. In this example, the row and column identifier characters are more visible the other row and column indicators by manner of the contrast between them. The portion 410 is also more visible due to the contrast provided by the overlay that was generated by selecting the portion. In one example, contextual actions may be applied, such as a fit to screen button 415.

A user may use common zoom functions to zoom in on any desired portion of the content they are viewing, such as the spotlighted portion 410. The fit to screen button may be used to toggle the display such that the spotlighted portion 410 expands to fill at least one dimension of the screen or to return to the view shown which includes the context of the spotlighted portion 410. A user may also use the fit to screen button to zoom a user selected range to fit the screen, independently of use of the spotlighting. Comments may also be added.

Figure 5:
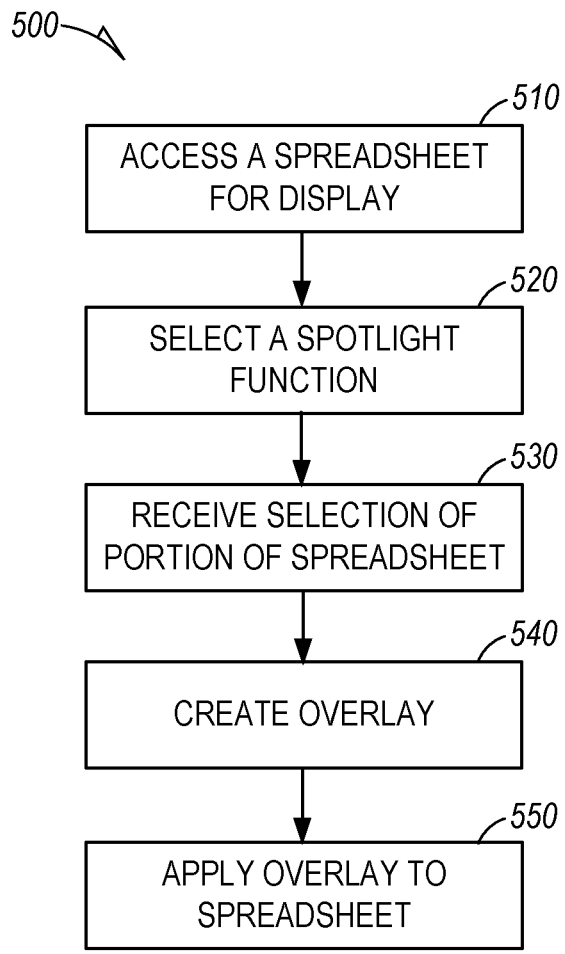
FIG. 5 is a flowchart illustrating a computer implemented method of creating a spotlight of a selected portion of a spreadsheet being displayed according to an example embodiment.

FIG. 5 is a flowchart illustrating a computer implemented method 500 of creating a spotlight of a selected portion of a spreadsheet being displayed. Method 500 begins by accessing, at operation 510, a spreadsheet for display on a display screen during a presentation. At operation 520, a selection to execute a spotlight function is received. The spotlight function may be used by a user via a cursor control device to select a portion of the spreadsheet being displayed. The selection of the portion is received at operation 530. The selected portion may be range of cells comprising cells identified by an intersection of multiple contiguous rows with multiple contiguous columns of the spreadsheet. In further examples, the selected portion may be an object, such as a table or chart embedded in the spreadsheet.

At operation 540, an overlay is created via the spotlight function. The overlay has a transparent cavity corresponding to the selected portion of the spreadsheet. The overlay is applied to the spreadsheet being displayed at operation 550 such that the selected portion is visible and other portions of the spreadsheet are obscured. The selected portion is more visible and discernable than the obscured portions in various examples.

Scalable vector graphic (SVG) techniques may be used for layering of the overlay and spreadsheet. Such techniques provide reduced memory and better performance. In one example, rotation of the spreadsheet and corresponding overlay may be used. Spotlighting may be used with a shared screen via video conference such that remote participants and collaborators have their attention drawn to the selected portion. In a further example, the spotlight function may be used during collaborative access to a cloud hosted spreadsheet or when a user selects multiple ranges to be focused on.

Figure 6:
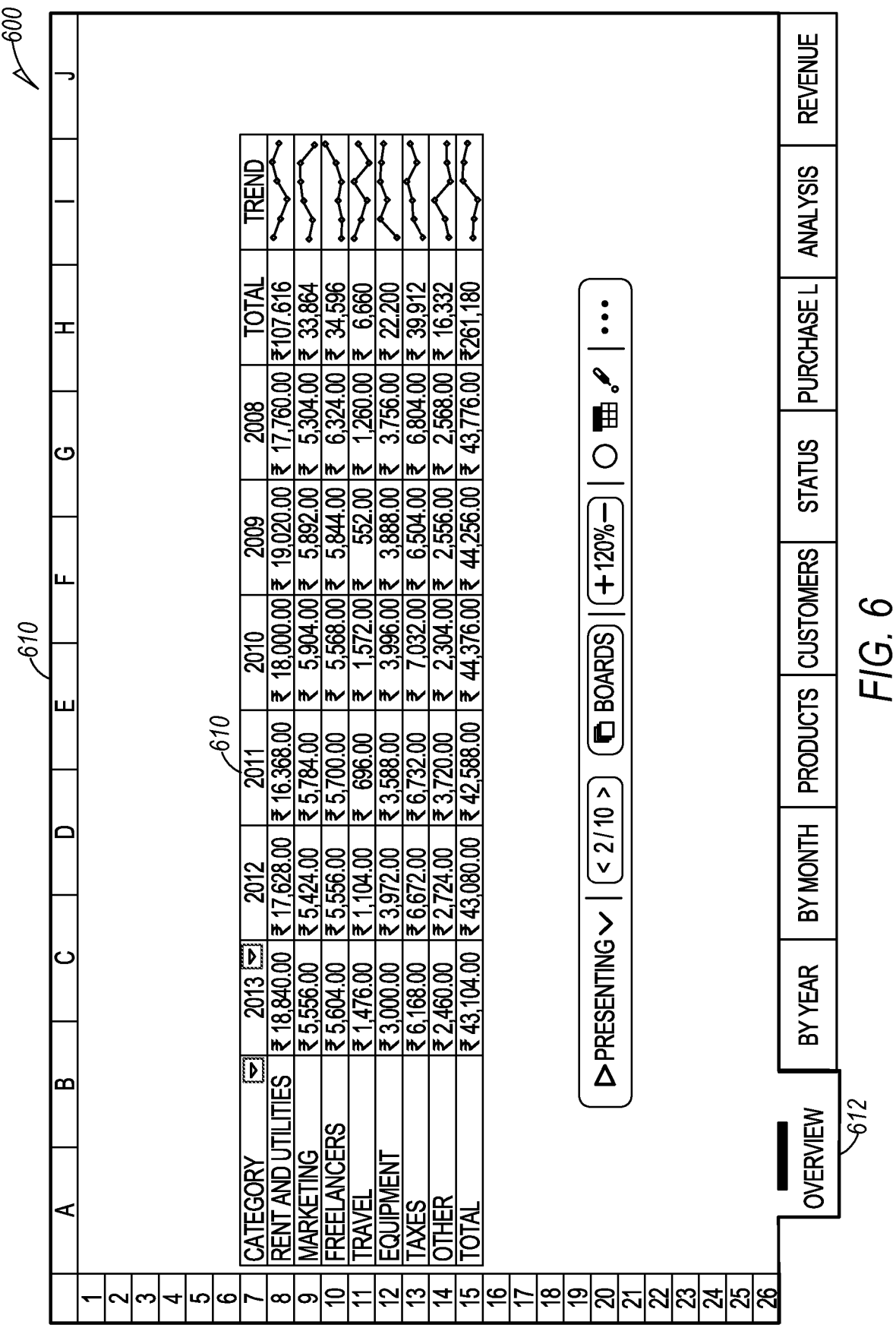
FIG. 6 is a screen shot of an example spreadsheet workbook showing a portion of an overview sheet according to an example embodiment.

The storyboarding function may be selected in a manner similar to the spotlight function from menu 215. FIG. 6 is a screen shot of an example spreadsheet workbook 600 showing a portion 610 of an overview sheet 612 of the workbook 600 selected by use of the storyboarding function. Portion 610 may be selected for inclusion in a storyboard by marking a range of cells in the sheet and hitting enter or otherwise indicating the portion 610 should be saved or persisted. Portion 610 comprises an intersection of rows 7-16 and columns A-I. In further embodiments, portion 600 may comprise an object, such as a chart, graph, or image that is embedded in the workbook 600. Workbook 600 has several sheets, with the Overview 612 sheet being displayed. Other sheets in this example workbook 600 include By Year, By Month, Products, Customers, Status, Purchase L, Analysis, and two Revenue sheets.

Figure 7:
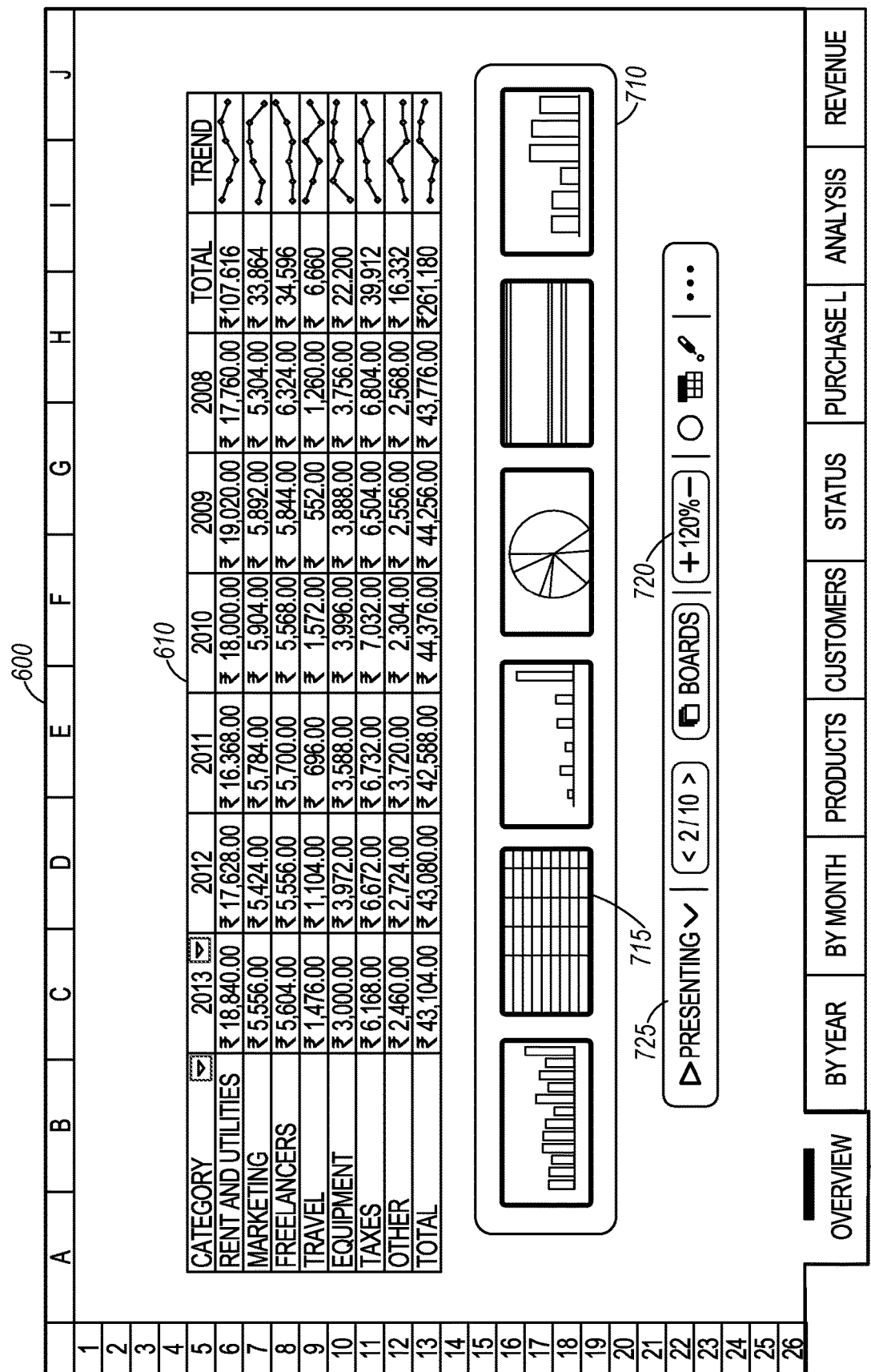
FIG. 7 is a screenshot illustrating storyboarding following selection of multiple portions of sheets in the workbook according to an example embodiment.

FIG. 7 is a screenshot 700 illustrating storyboarding following selection of multiple portions of sheets in the workbook 600. A presentation flow 710 is shown below the selected portion 610. Each of the selections is persisted in the presentation flow 710 with the currently displayed portion 610 being the second persisted selection shown at thumbnail 715 in the presentation flow 710. The presentation flow 710 shows each of the selected portions in a sequence of thumbnail versions that are large enough to identify by a presenter.

The presentation flow 710 in this example includes ten boards, which may be from multiple different sheets. The presenter may click or arrow through the thumbnail versions to change which portion is displayed in a larger presentable version such as that shown at portion 610. In one example, selection of a thumbnail causes the corresponding portion to be displayed in a larger or zoomed in manner. The amount of zoom may also be selected by the presenter during generation of the storyboard prior to presenting. The zoom may also be modified during presentation via zoom control 720.

The storyboarding function may be used while sharing content during a meeting by selecting a presenting mode 725. In one example, the presenter may be toggle between presenting mode and utilize spotlighting to highlight other portions of a sheet of the workbook. Given that flexibility, the storyboarding function may be used in formal meetings where the presenter is most likely to just run straight through the storyboard. The storyboarding function may also be used in informal and collaborative meetings to help set an agenda or run through some quick points to set the stage for the rest of the meeting. Large workbooks may require scrolling through hundreds of lines or multiple different sheets to navigate to show desired portions. The use of the storyboarding function allows a user to pre-select the desired portions and then efficiently present the portions without having to scroll or search for the portions during the meeting. A presenter may even create an agenda in a sheet and quickly navigate back to it using the presentation flow.

Figure 8:
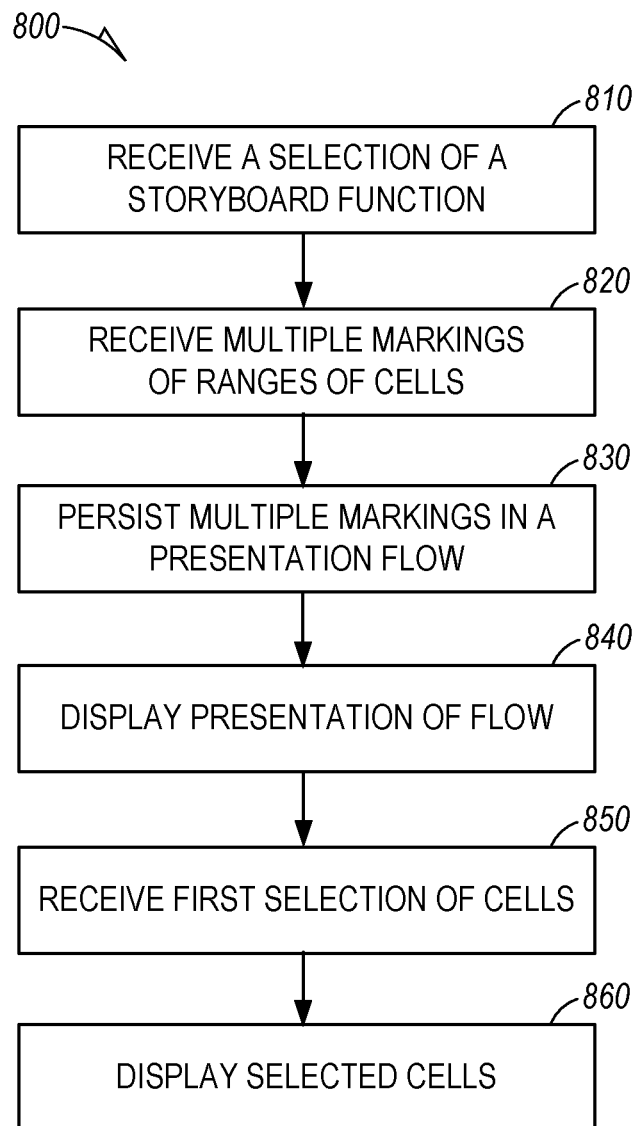
FIG. 8 is a flowchart illustrating a computer implemented method 800 for creating a storyboard according to an example embodiment.

FIG. 8 is a flowchart illustrating a computer implemented method 800 for creating a storyboard. Method 800 begins at operation 810 by receiving a selection of a storyboard function in a spreadsheet. At operation 820, multiple markings of ranges of cells are received in the spreadsheet via the storyboard function. Marked ranges may be from multiple sheets of a workbook and may be portions of one sheet. At operation 830, the multiple markings are persisted/saved in a presentation flow. The flow may be named to allow ease of access and reuse for different or even recurring meetings. Previously saved flows may be modified and saved.

A representation of the presentation flow is displayed at operation 840 as multiple selectable marked ranges of cells. The presentation flow may be displayed as a series of navigable smaller representations of the marked ranges of cells, such as thumbnail images. A selection of a first one of the multiple selectable marked ranges of cells is received at operation 850. The first one of the marked ranges may include any one of the multiple selectable marked ranges of cells. A presentable version of the first one of the multiple selectable marked ranges of cells is displayed at operation 860. The first one of the marked ranges is zoomed upon selection to fit a window.

Figure 9:
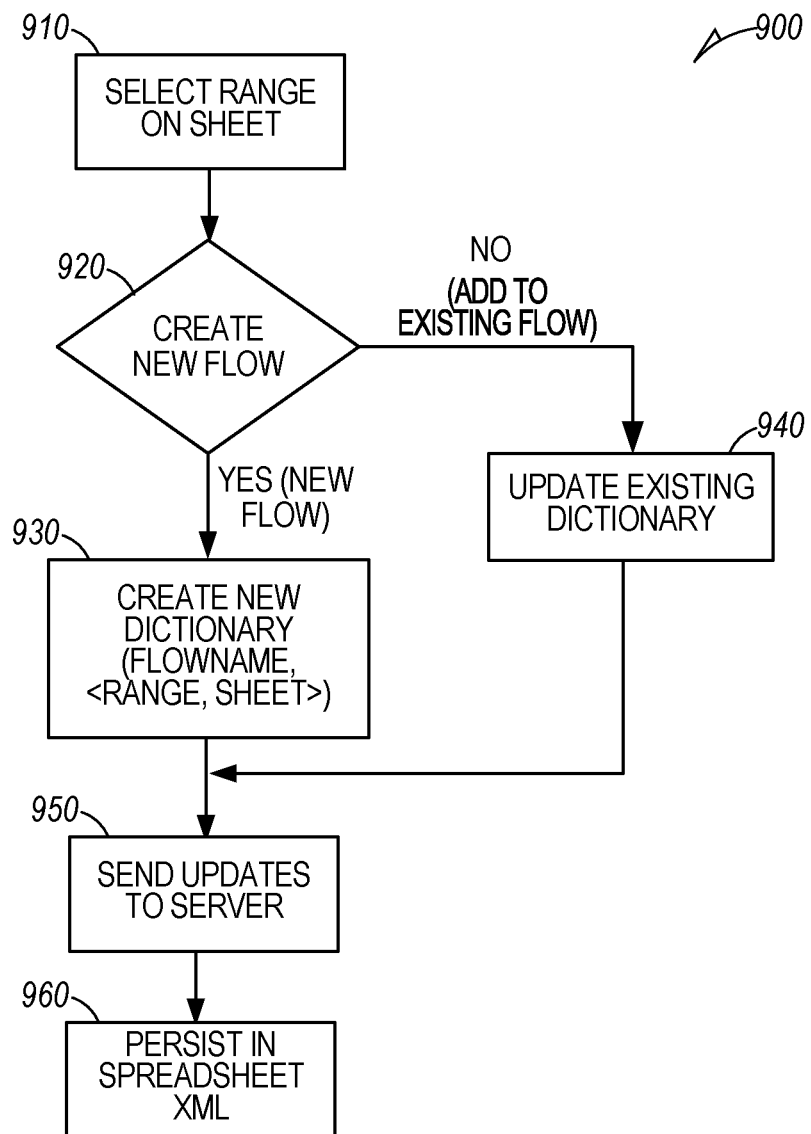
FIG. 9 is a flowchart illustrating a computer implemented method of creating a storyboard flow according to an example embodiment.

FIG. 9 is a flowchart illustrating a computer implemented method 900 of creating a storyboard flow according to an example embodiment. Method 900 begins at operation 910 by a user selecting a range of cells on a sheet. At decision 920, if a user selected an option to create a new flow, a new flow is created at operation 930 as a new dictionary with a flowname, a range of cells identified, and sheet identified. If decision 920 received input from a user that it was not desired to create a new flow, operation 940 updates and existing dictionary for an existing flow with the range selected identified. At operation 950, updates are sent to a server to store the new flow or changes to an existing flow. The result is persisted in the spreadsheet at operation 960. The result may be encoded using XML.

Figure 10:
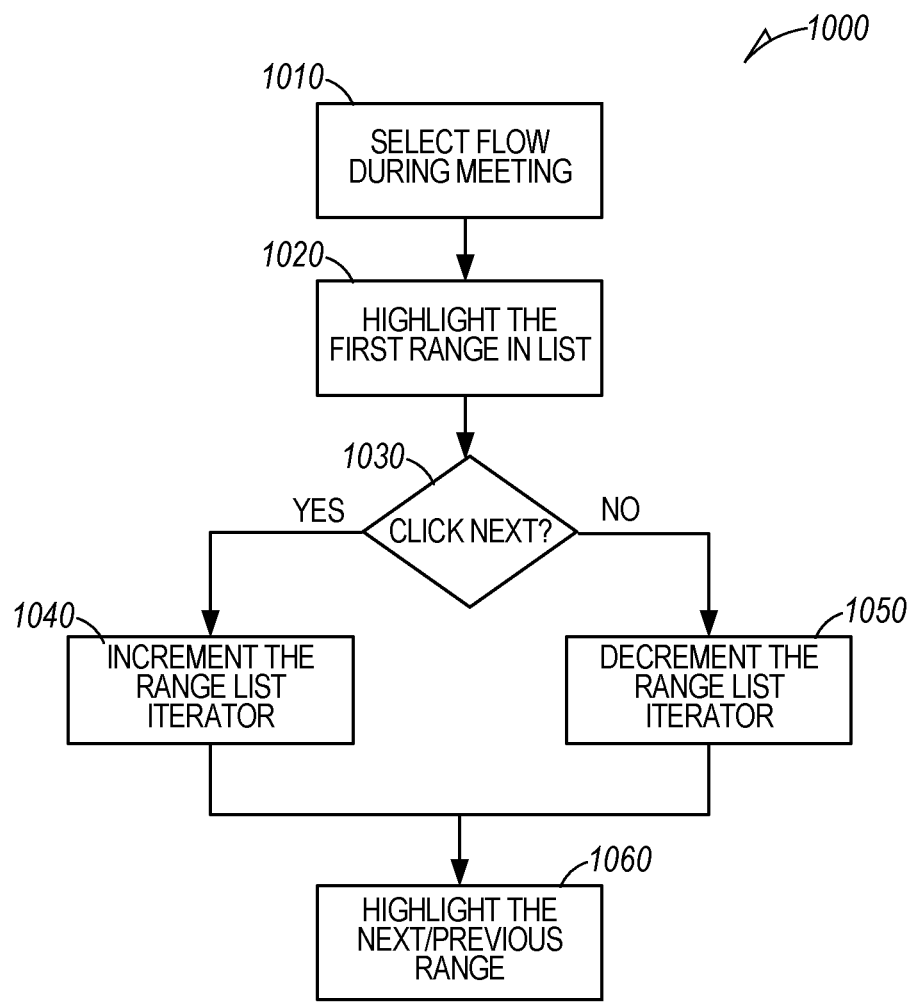
FIG. 10 is a flowchart illustrating a computer implemented method of presenting a storyboard flow according to an example embodiment.

FIG. 10 is a flowchart illustrating a computer implemented method 1000 of presenting a storyboard flow according to an example embodiment. Method 1000 begins at operation 1010 by a user selecting a flow during a meeting. A list of flows may be presented to the user for selection. At operation 1020, a first range in a list of ranges in the selected flow may be highlighted. At decision operation 1030, the User may click to navigate between ranges in the flow. In one example, a click may specify to move to a next range at 1040, or a previous range at 1050. Left and right arrow keys may be used to navigate in a further example. Decision operation 1030 allows one or iterate through the list of ranges in a flow such that either a next or a previous range is highlighted at operation 1060.

In one example, an optimized view function may be used to enable devices to display information in shared content loaded into their corresponding meeting app that has an optimized zoom level for the corresponding device display size and current resolution. In one example, zoom levels for devices may be derived based on meeting information collected before or during the meeting. Devices may provide display size information as part of accepting a meeting request, or even during initial entrance into a meeting.

The ability to optimize the view of shared content that is actually loaded into local meeting apps for each device can alleviate network bandwidth issues caused by streaming video using prior meeting programs that rely on screen sharing. Since the content is already local to the device, or derived from a separate cloud connection, meeting network bandwidth used is minimized and video fidelity can be maintained for each device display.

Based on screen size, and material being presented, the receiving devices may receive a zoom level that is optimized for their display device. The zoom level may be selected to ensure that the presenter context is visible. The view provided on the receiving device displays may also be scrollable so user of the receiving devices can scroll through information if the content being shared is too large to display in the entirety.

The optimized view function provides a suitable view for all participants during collaboration taking care of screen real estate and zoom settings based on each participants screen size, resolution, and type of display device. Optimizing the view for each participant provides enough presenter context and readability for an effective live session. In one example, machine learning based on user behavior may be used to provide an optimized view while a spreadsheet is being presented or shared by another user. The optimized view function reduces the poor readability that was common as device screen size and device ability differs from device to device and person to person. Each meeting participant views the same file at a different zoom level optimized with respect to the user device, ensuring readability of the content is maintained while the spreadsheet app is being presented.

In one example, the optimized view function may utilize an optimized view tuple. The optimized view tuple includes: Screen Size, Window Size, DPI, Scale factor, and User's worksheet Zoom Level. The optimize view tuple is fetched during loading of a workbook.

For cases of a non-maximized window, extrapolated window size is calculated. This includes removing a calling window gutter for precise extrapolation. Historical data of the most prevalent zoom level for the above input optimize view tuple is fetched (shared factor).

Historical data of user's most prevalent zoom level across multiple workbooks is also fetched (private factor).

Based on a weighted formula, an optimized zoom level is calculated for each meeting attendee ensuring the most readable content which spreadsheet is presented.

Figure 11A:
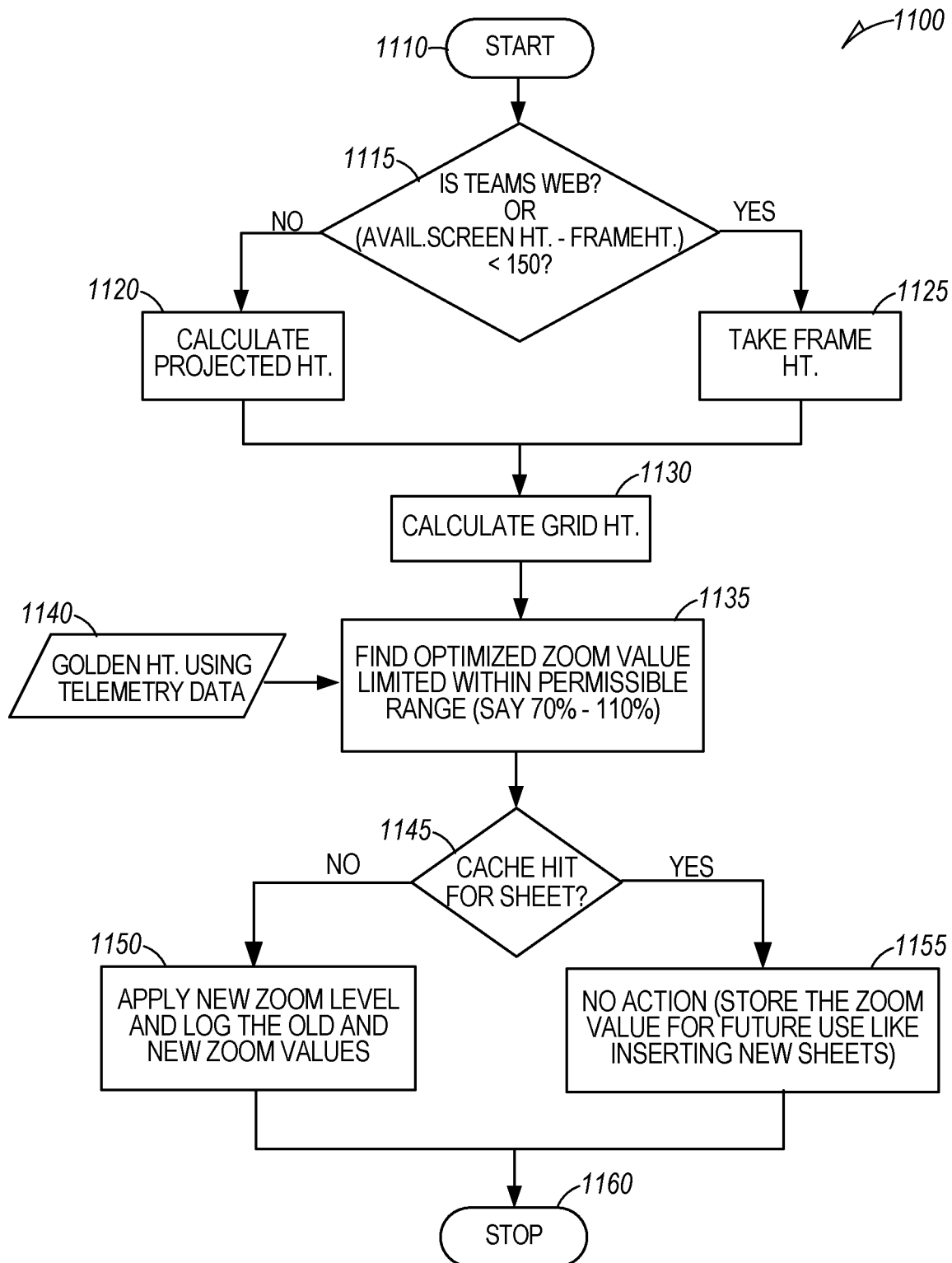
FIGS. 11A, 11B, 11C, 11D, and 11E are a flowchart illustrating a computer implemented method of optimizing zoom level according to an example embodiment.
Figure 11B:
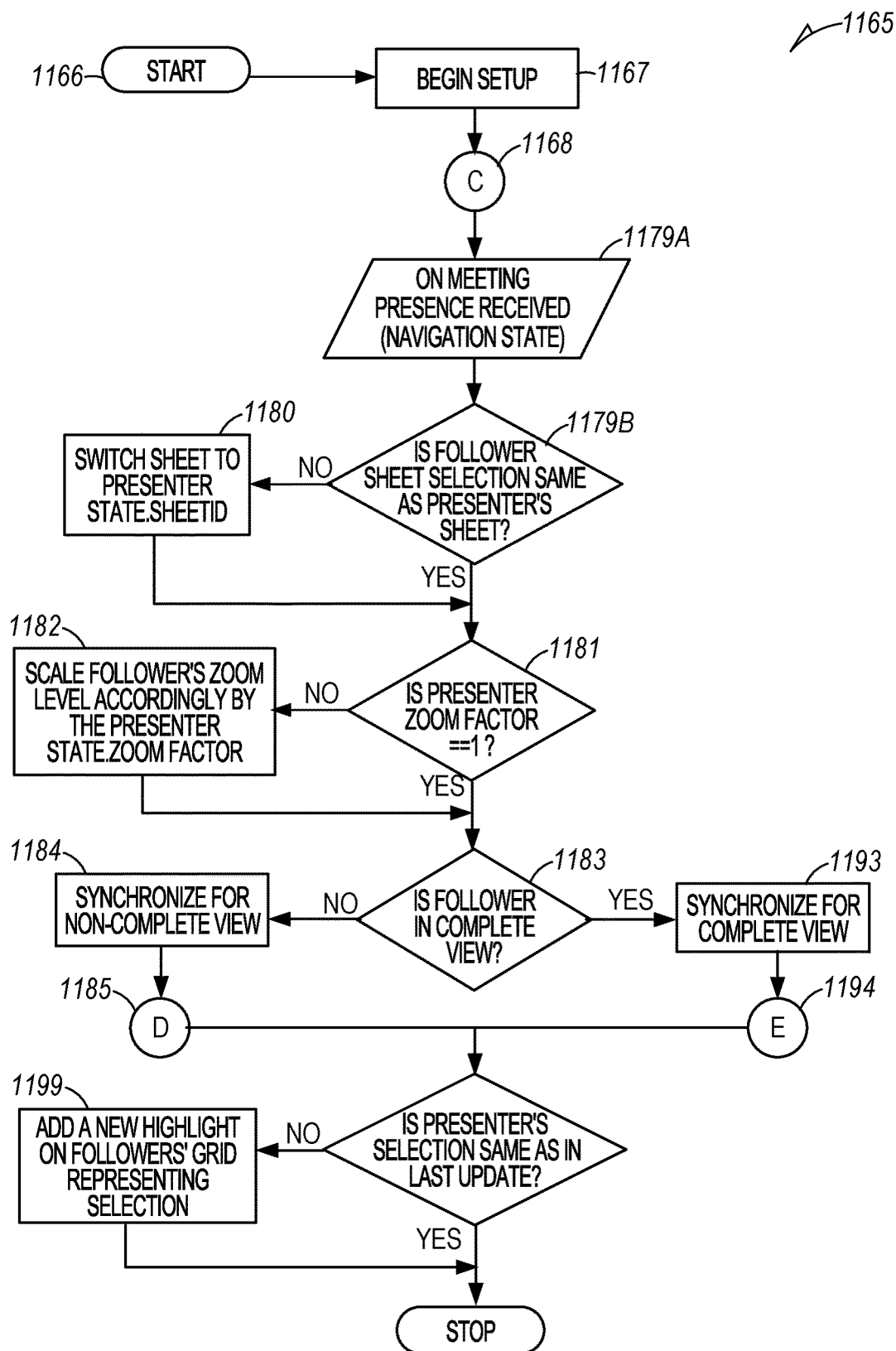

FIG. 11A is a flowchart illustrating a computer implemented method 1100 of performing an optimized zoom for a device on which a spreadsheet being presented or shared is being viewed by a user. Method 1100 begins at start 1110 and proceeds to operation 1120 to determine if a meeting platform that provides an available screen height, Ht, is a parameter provided by the meeting platform. On such platform is Microsoft (R) Teams(R) meeting platform. If not, a projected Ht is calculated at operation 1120. If yes, a frame Ht is taken at operation 1125 via the meeting platform.

At operation 1130, a grid Ht is calculated. Operation 1135 finds an optimized zoom value. The optimized zoom value may be limited within a permissible range in one example, such as between 70% to 110%. Increments of 5% may be used in one example.

At operation 1145, method 1100 determines whether or not a cache hit for a sheet being shared has occurred. If no, operation 1150 applies the optimized zoom value and logs the prior value and the new optimized zoom value. If yes, operation 1155 takes no action to modify the current zoom level but does log the new optimized zoom value for future use, such as while inserting sheets in a workbook. Method 1100 stops at 1160 but may begin again in response to a new sheet being shared.

FIGS. 11B, 11C, 11D, and 11E depict a detailed flowchart illustrating a computer implemented method 1165 of performing an optimized zoom for a device on which a spreadsheet being presented or shared is being viewed by a user. Method 1165 begins at start 1166 and proceeds to operation 1167 to begin setting up optimized zooming for meeting followers.

Figure 11C:
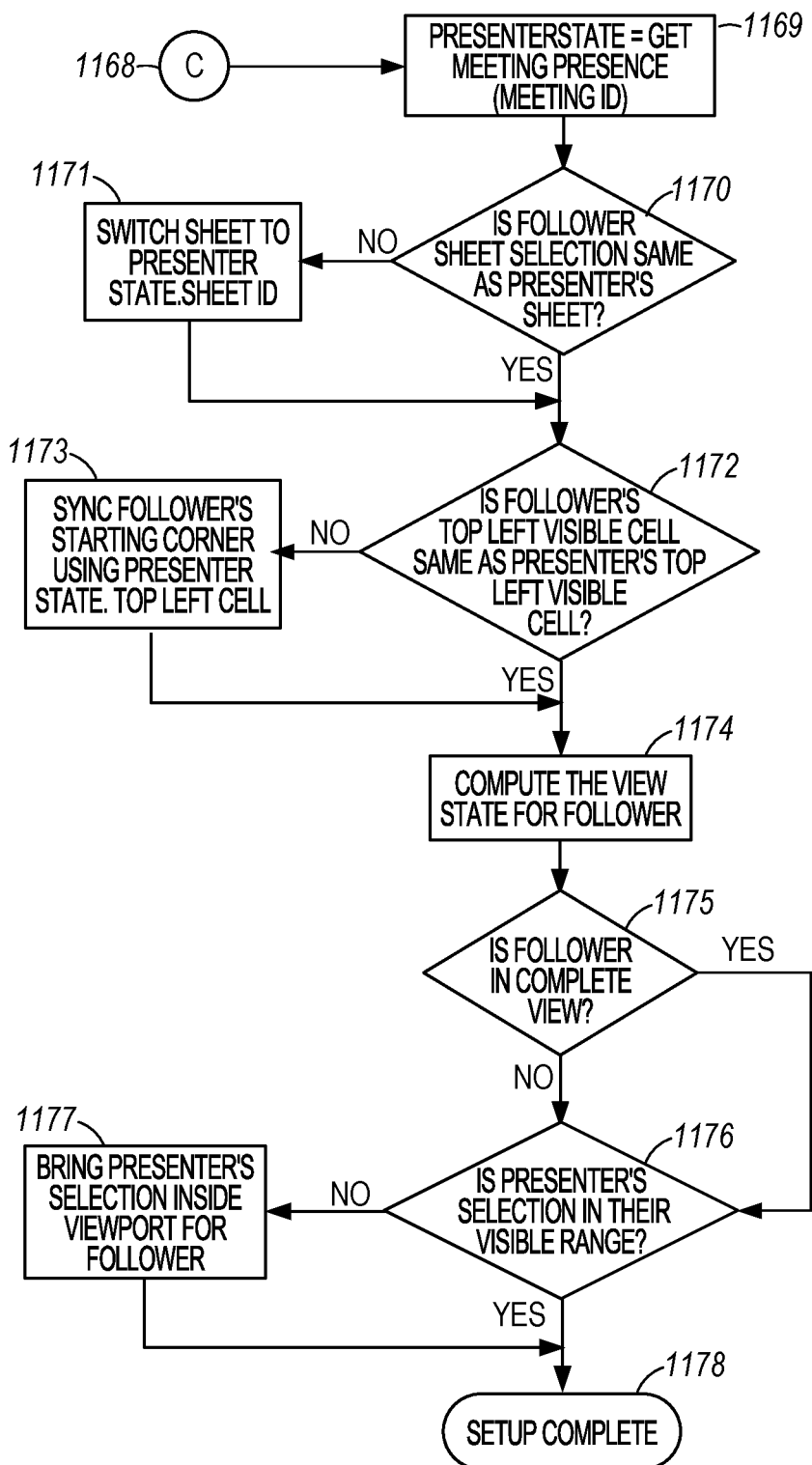

A startup process 1168, labeled "C" is shown in FIG. 11C and proceeds as follows. At operation 1169 a presenter state is set to GetMeetingPresence(meetingID). At decision operation 1170, if the follower sheet selection is not the same as the presenter's sheet, operation 1171 switches the sheet to the presenterState.SheetID. Once set, or if already the same as the presenters sheet, decision operation 1172 determines if the follower's top left visible cell is the same as the presenter's top left visible cell. If not, operation 1173 synchs the follower's starting corner using presentersState.TopLeftCell. Once synched, or if already synched, operation 1174 computer a view state for the follower.

Decision operation 475 determines if the follower is in a complete view state. If not, decision operation 1176 determines if the presenter's selection is in the follower's visible range. If yes, the presenter's selection is brought inside the viewport or viewing area of the follower's display at operation 1177. If either the view was complete as determined at decision operation 1175, the selection is in the viewers visible range at operation 1176, or the selection was brought into view by operation 1177, the setup is complete at 1178 and processing returns to FIG. 11B at 1168.

Once setup is complete, an OnMeetingPresenceRecieved (navigationState) indication is received at operation 1179A indicating a follower is attending the meeting. At decision operation 1179B, a determination is made if the follower sheet selection is the same as the presenter sheet. If not, the follower sheet is switched to the presenterState.SheetID at operation 1180. If yes at decision operation 1179B, a decision operation 1181 determines if the presenter zoom factor is equal to 1. If not, the followers zoom level is scaled at operation 1182 to the presenterState.zoomFactor. If yes at decision operation 1181, decision operation 1183 determines if the follower is in a complete view. If not, operation 1184 synchronizes for the non-complete follower view.

Figure 11D:
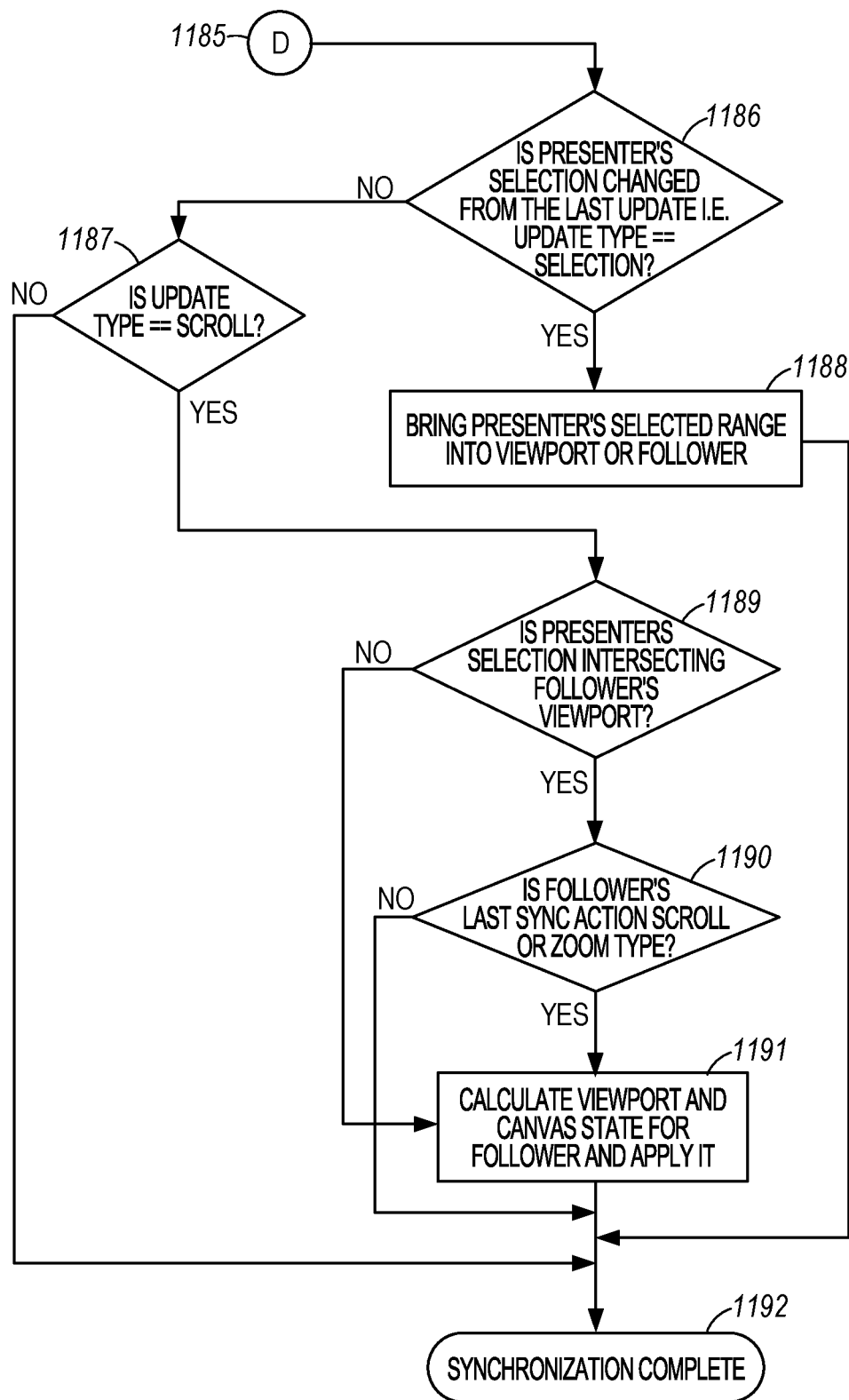
Figure 11E:
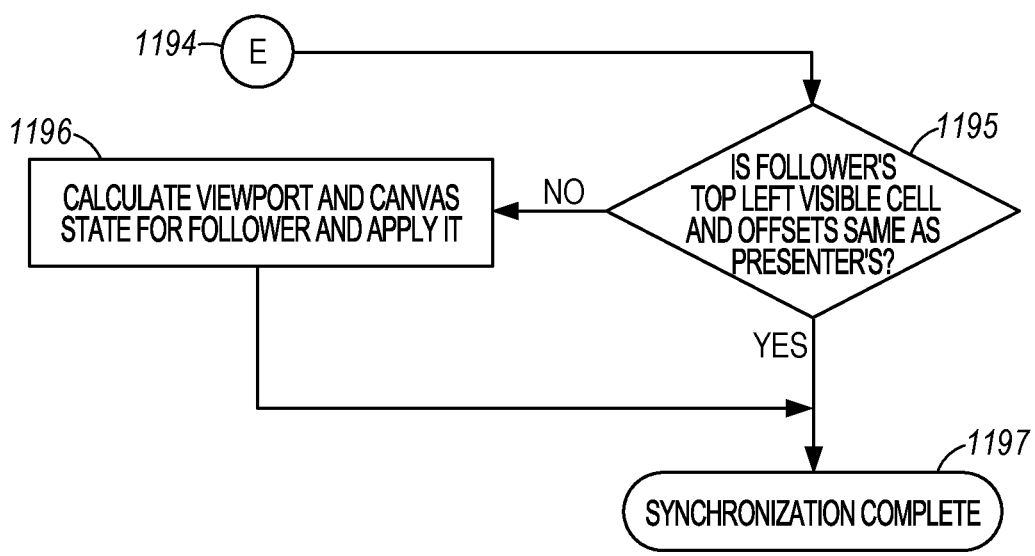

Process 1165 then proceeds to process D 1185 as shown in FIG. 11D.

A decision operation 1186 determines if the presenter's selection changed from a last update, such as updateType=Selection. If yes, the presenter's selected range is brought into a viewable area, a viewport, of the follower's display. If no, a decision operation 1187 determines if the updateType=Scroll. If yes, decision operation 1189 determines if the presenter's selection is intersecting the follower's viewport, if yes, decision operation 1190 determines if the follower's last sync action as a scroll or zoom type of action. If yes, operation 1191 calculates a viewport and canvas state for the follower and applies that state. The synchronization is complete at operation 1192. Operation 1192 may also be entered from decision operation 1187 if the update type was not a scroll, from decision operation 1190 if the last follower action was not a zoom or scroll, and from decision operation 1189 in response to the viewers view not intersecting the presenter's view and applying operation 1191 to ensure they are intersecting. Once sync is complete at 1192, processing returns to FIG. 11B In FIG. 11B, if decision operation 1183 determines that the follower's view is complete, operation 1193 synchronizes for complete view. Processing then proceeds either from operation 1193 or from completion of D 1185 to E 1194 in FIG. 11E. Decision operation 1195 determines if the followers topleft visible cell and offsets are the same as the presenter's. If no, operation 1196 calculates viewport and canvas states for the follower and applies the states. Upon completion of operation 1196 or decision operation 1195 determining yes, synchronization is complete at operation 1197 and processing returns to 1194 in FIG. 11B.

At decision operation 1198, a check is made to determines if the presenter's selection is the same as the most recent previous update. If no, a new highlight on the follower's grid representing a selection is added at operation 1199. Method 1165 stops at operation 11100.

In some collaborative spreadsheet applications, changes being made by one collaborator to a cell in a spreadsheet are not seen by other collaborators until the change is committed, such as by hitting enter or navigating away from the cell being modified. A live typing function may be used to allow other users to see the changes as the changes are being entered and prior to commitment. The live typing function can increase collaboration, as feedback can be provided during the change, especially if the changes are being made during a meeting.

Figure 12:
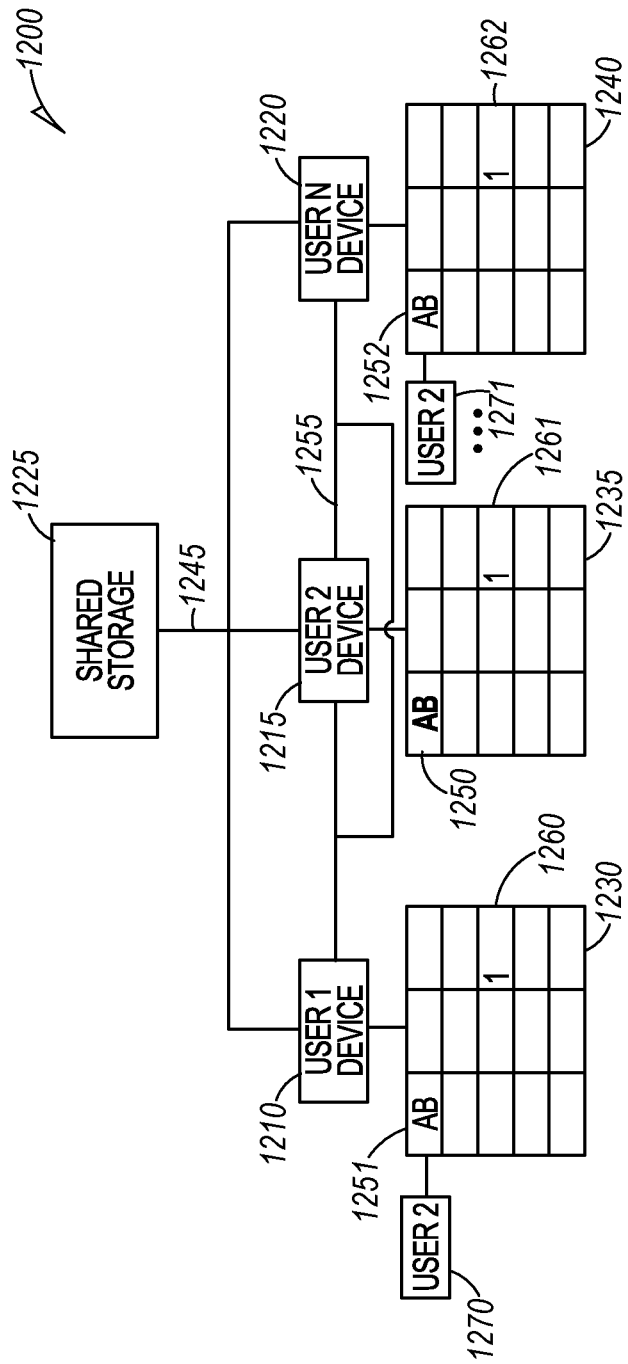
FIG. 12 is a block diagram illustrating a system for performing live typing functions according to an example embodiment.

FIG. 12 is a block diagram illustrating a system 1200 for performing live typing functions. System 1200 shows multiple collaborative devices 1210, 1215 and 1220 coupled to access a shared spreadsheet in a shared storage 1225, and 1220 coupled to access a shared spreadsheet in a shared storage 1225 The devices are associated with respective users 1, 2 and N. There. There may be between two and many users that are collaborating on respective devices. Each device is shown displaying a respective copy of the spreadsheet at 1230, 1235, and 1240. Shared storage 1225 provides the access via network connection 1245 and also includes a spreadsheet application to facilitate interaction with the spreadsheet.

In one example, each collaborate device may make changes to the spreadsheet in their own copy. In one example, a user 2 of device 1215 has entered text "AB" into a first cell 1250 of spreadsheet 1235. The text has not yet been committed to the first cell 1250. As user 2 is entering the text, the text is mirrored to the other collaborative user devices 1210 and 1220 and appears in the corresponding cells 1251 and 1252 in each spreadsheet 1230 and 1240.

The text is communicated in one example via a common local channel between meeting participants, such as real time channel (RTC) 1255, which may be based on web sockets. All collaborative devices 1210, 1215, 1220 may be connected to a common channel to share both persistent and non-persistent changes either during a meeting or during other collaboration. The text "AB" being entered is a non-persistent change, as the change has not yet been committed.

In one example, text entered into a cell during a selected time window, such as 50 milliseconds, is broadcast as a notification. The time window may be selected to reflect average typing speeds while reducing bandwidth and data processing resources by not continuously broadcasting updates. The time window may be thought of as a debouncing technique used to reduce the number of communications or notification rate. There would likely be two separate broadcasts, one of the character "A" followed by one of both characters "AB". Each broadcast contains all characters in a cell, which is why the second broadcast includes both characters, A and B. If no changes occur during further time windows, no broadcast need be transmitted.

Each of the other devices 1210 and 1220 receive the broadcasts and update the corresponding cells with the change. The text "AB" in cell 1250 may appear with normal attributes and the mirrored text in cells 1251 and 1252 may appear with a different attribute, such as a different color, opacity, lighter font, or other attribute to indicate they represent a change that has not been committed. The difference in attributes distinguishes mirrored text that has yet to be committed from committed or persistent changes. Upon the change in cell 1250 being committed or persisted, the commitment is broadcast to the other devices, changing the attributes of the text in cells 1251 and 1252 to be consistent with other cell text or characters. One example of committed changes is shown in cells 1260, 1261, and 1262 as the character "1".

In one example, the broadcast includes attribution information identifying the originator of the change. In the case of the text "AB" being entered by user 2 of device 1215, the attribution information appears as "USER 2" in a presence bubble indicated at 1270 and 1271 for respective collaborator devices 1210 and 1220. The bubbles may persist for a desired amount of time following commitment of the change to help identify a recent change.

Figures 13, 14:
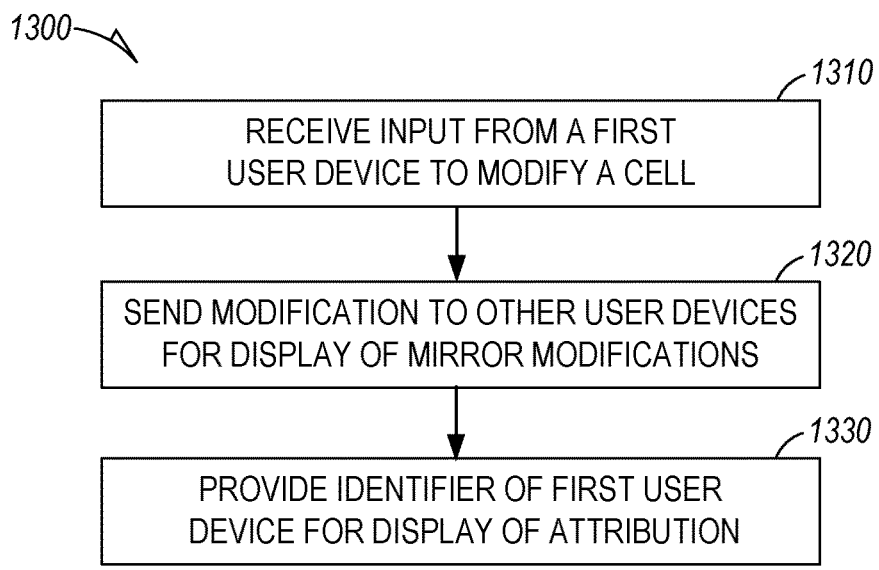
FIG. 13 is a flowchart of a computer implemented method 1000 of mirroring text during a spreadsheet collaboration according to an example embodiment.
FIG. 14 is an example meeting change tracking data structure that represents information associated with changes that occur to the private or meeting copy of the spreadsheet during a meeting according to an example embodiment.

FIG. 13 is a flowchart of a computer implemented method 1300 of mirroring text during a spreadsheet collaboration. As indicated above, mirroring text may be an option selected by any one or more collaborators via menu 215. The collaboration may be occurring during a meeting or during any time at which multiple users are editing a spreadsheet or sheet of a workbook.

Method 1300 begins at operation 1310 by receiving input from a first user device to modify a cell in a collaborative spreadsheet being shared with other users and viewable on other user devices. The modifications may be characters, text, formulas, or other changes that are sent at operation 1320 via a real time channel to the other user devices for display of real time mirrored modifications to the cell prior to commitment of the modifications. At operation 1130, an identifier of the first user device is provided for display of a notice that the first user device is associated with the mirror modifications.

In one example, the modification are sent as notifications periodically. The changes may be buffered for a desired number of milliseconds, such as 50 milliseconds. Notifications may be sent periodically even if no changes have occurred or may be triggered to be sent in response to a change being detected the occurred during a period of time. The notifications may include the changed characters, identification of the cell being changed by row and column identifiers, and an identification of the entity making the change. The notification may also include an indication of whether the change has been persisted or not. Persistence indication may be used to ensure that the mirrored changes have an attribute that represents whether the change has been committed or not.

During collaborative meetings, many changes may be made by those in the meeting. The meeting may be referred to as a private lobby, with collaborators working together to modify a spreadsheet that is a temporary copy of the overall shared spreadsheet from the shared storage. Only those collaborators in the meeting may make changes to the private copy. Such collaborators may be identified from a meeting invite or from information identifying collaborators as connected to the meeting. Such changes may be tracked in one example. In one example, only those in the meeting may see the changes.

In a further example, the spreadsheet stored on the file sharing system 115 may be directly edited with other collaborators, not in the meeting, or in a defined current group of collaborators, locked out from editing the spreadsheet.

FIG. 14 illustrates a data structure 1400 that represents information associated with changes that occur to the private or meeting copy of the spreadsheet during a meeting. The meeting may have information that identifies attendees and a topic for the meeting. This may be referred to as a meeting context 1410 which may be encoded into the data structure 1400. An organizer may also be identified in the context 1410 as well as other information that describes the context of the meeting. In one example the context may be related to reviewing a financial data sheet or sheets of a project from a shared project workbook.

The data structure 1400 may include for each change, a time and date 1420, cell identification 1430, previous value 1440, new value 1250, and a user identification 1460. The time and date may include a time and date during the meeting at which a change was committed. The data structure may be maintained via the spreadsheet extensibility app 135 associated with meeting system 110 in one example, via the organizing device 120, or via the file sharing system 115. The data structure may be generated from the periodic change notifications that indicate committed changes.

Data structure 1400 shows a first committed change at 1470 made at 8:30 AM on Feb. 3, 2022. Cell 1A was changed from having a value of 22 to a value of 46 by user 2. Several more changes may be included in data structure 1400 by one or more of the collaborators in the meeting.

The data structure 1400 may be used, following the meeting to update the copy of the workbook stored in the file sharing system 115 by simply going through the list of changes and applying them, or simply adjusting and merging the changed private copy as a newer version of the stored workbook. The organizer may wish to review the changes and can use the data structure 1400 to accept or reject changes, or continue to edit the private copy, and store the edited private copy.

Figure 15:
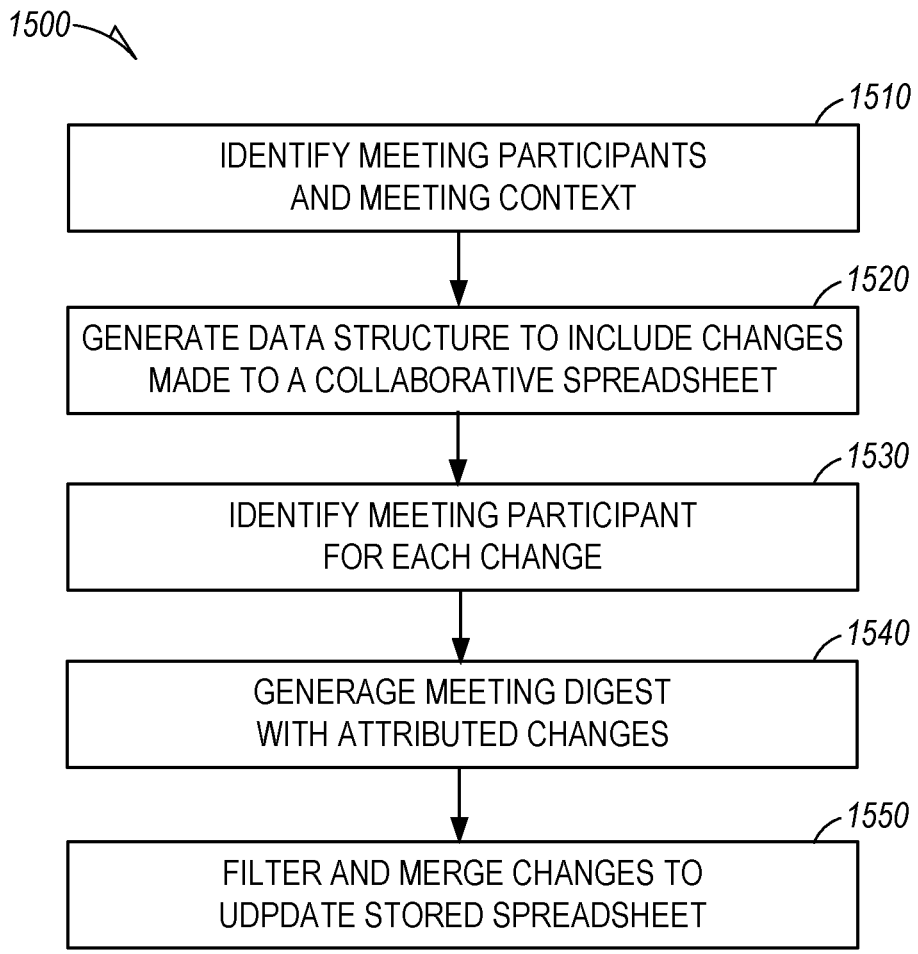
FIG. 15 is a flowchart of a computer implemented method for tracking changes to a workbook during a meeting according to an example embodiment.

FIG. 15 is a flowchart of a computer implemented method 1500 for tracking changes to a workbook during a meeting. Method 1500 begins at operation 1510 by identifying meeting participants and a meeting context. An enhanced file format, such as data structure 1400 is generated at operation 1520 to include changes made to a collaborative spreadsheet during the meeting.

At operation 1530, a meeting participant is identified for each change. A meeting digest, such as data structure 1420 is generated at operation 1530 and provided to a user, such as the meeting organizer. The meeting digest includes the meeting context, each change made by a meeting participant, and an identifier of a corresponding meeting participant for each change. The meeting digest may be in the form of data structure 1200 which may alternatively be a JSON representation, or simply a character delineated string of concatenated changes in further examples.

At operation 1540 the changes may be merged with a main file containing a version of the collaborative spreadsheet prior to the meeting. The changes may be filtered using information in the meeting context to ensure only meeting participant changes are included in the meeting digest.

In some examples, other collaborators may be making changes to the same workbook. These changes may be referred to as public changes. Such other collaborators may make changes to a public copy of the workbook with the changes tracked in a similar data structure referred to as a public change tracking data structure.

Figure 16:
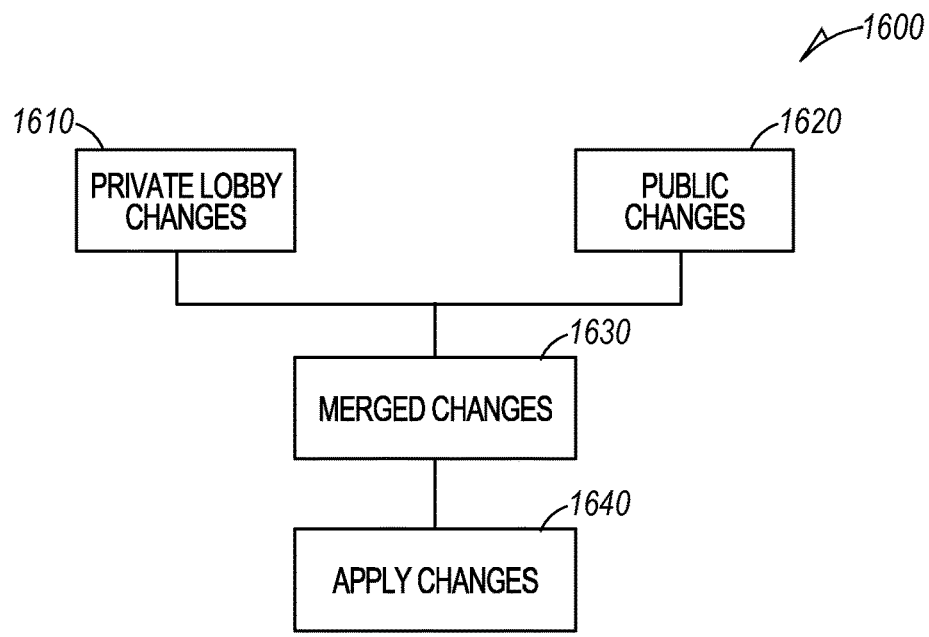
FIG. 16 is a block flow diagram illustrating merging of private and public changes according to an example embodiment.

FIG. 16 is a block flow diagram illustrating merging of private and public changes generally at 1600. Private changes 1610 and public changes 1620 may be merged at 1630 to create a merge changes digest or file 1630. The merge change digest 1630 may be displayed directly or may also be shown in the context of a view of the workbook with the change shown and allowing acceptance, rejection, or further modification. In one example, each row of the digest may show the merged changes in chronological order. In the case of the digest being in the form of data structure 1400, the changes may be highlighted and accepted, rejected, or modified by hitting enter or clicking on suitable actions of accept or reject.

In one or more examples presentation of collaborative spreadsheets in workbooks may be enhanced by the use of a transparent overlay with the spotlight mode and a ribbon with previews of focused portions in the spotlight mode to show and control views during a spreadsheet presentation. Collaborators may also have a customized zoom level based on collaborator device display parameters.

Further enhancements include management of changes in the spreadsheet that were made during presentation or during other collaboration. The changes may be tracked by using a data structure that identifies the changes and the author of the changes. Changes made during the meeting may be merged into the underlying workbook.

Real-time editing of the spreadsheet may also be displayed to collaborators using RealTime Channel (RTC) based web sockets to mirror text being typed by other collaborators with attribution. All collaborators may be connected to a common local channel sharing persistent/non-persistent updates.

Figure 17:
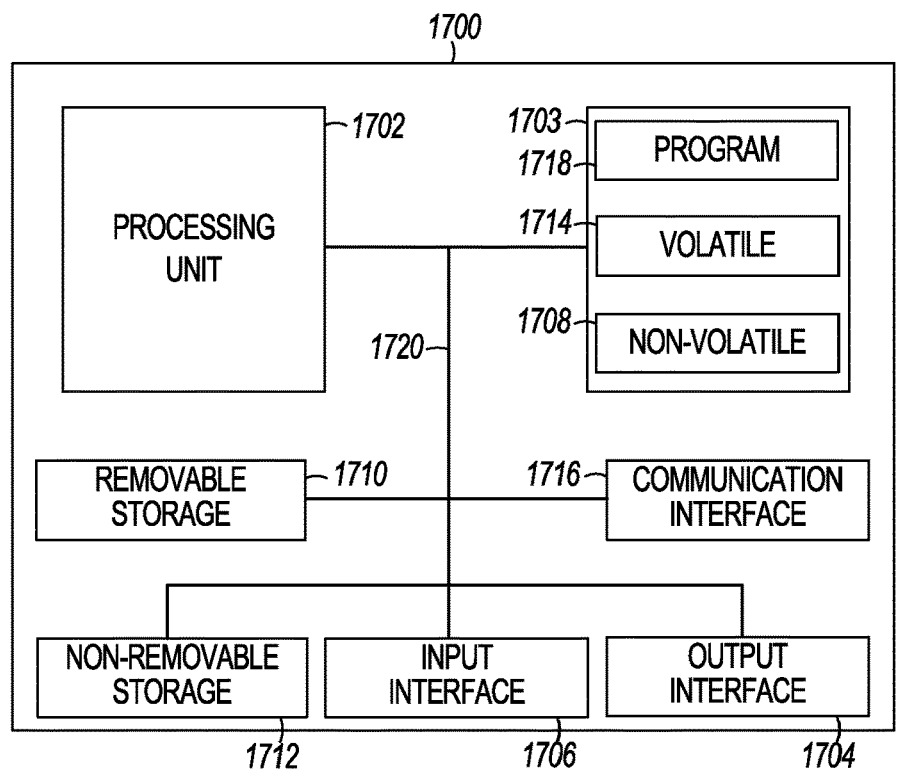
FIG. 17 is a block schematic diagram of a computer system to implement one or more example embodiments.

FIG. 17 is a block schematic diagram of a computer system 1700 to perform enhanced spreadsheet presentation, sharing functions, for performing methods and algorithms according to example embodiments. All components need not be used in various embodiments.

One example computing device in the form of a computer 1700 may include a processing unit 1702, memory 1703, removable storage 1710, and non-removable storage 1712. Although the example computing device is illustrated and described as computer 1700, the computing device may be in different forms in different embodiments. For example, the computing device may instead be a smartphone, a tablet, smartwatch, smart storage device (SSD), or other computing device including the same or similar elements as illustrated and described with regard to FIG. 17. Devices, such as smartphones, tablets, and smartwatches, are generally collectively referred to as mobile devices or user equipment.

Although the various data storage elements are illustrated as part of the computer 1700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1703 may include volatile memory 1714 and non-volatile memory 1708. Computer 1700 may include — or have access to a computing environment that includes—a variety of computer-readable media, such as volatile memory 1714 and non-volatile memory 1708, removable storage 1710 and non-removable storage 1712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1700 may include or have access to a computing environment that includes input interface 1706, output interface 1704, and a communication interface 1716. Output interface 1704 may include a display device, such as a touchscreen, that also may serve as an input device. The input interface 1706 may include one or more of a touchscreen, touchpad, mouse, keyboard, camera, one or more device-specific buttons, one or more sensors integrated within or coupled via wired or wireless data connections to the computer 1700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1700 are connected with a system bus 1720.

Computer-readable instructions stored on a computer-readable medium are executable by the processing unit 1702 of the computer 1700, such as a program 1718. The program 1718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1718 along with the workspace manager 1722 may be used to cause processing unit 1702 to perform one or more methods or algorithms described herein.

Examples:

1. A computer implemented method includes accessing a spreadsheet for display on a display screen during a remote meeting, receiving a first selection to execute a spotlight function, receiving a second selection of a portion of the spreadsheet being displayed, creating an overlay via the spotlight function, the overlay having a transparent cavity corresponding to the selected portion of the spreadsheet, and applying the overlay to the spreadsheet being displayed such that the selected portion is visible and other portions of the spreadsheet are obscured.

2. The method of example 1 wherein the overlay is applied using scalable vector graphic layering for reduced memory and better performance.

3. The method of any of examples 1-2 wherein a portion of the overlay outside the transparent cavity is semitransparent.

4. The method of any of examples 1-3 wherein a portion of the overlay outside the cavity is opaque.

5. The method of any of examples 1-4 wherein the applied overlay and spreadsheet being displayed are rotatable.

6. The method of any of examples 1-5 and further including sharing the spreadsheet during the remote meeting with remote participant devices, the remote participant devices accessing and displaying the shared spreadsheet via a spreadsheet application being hosted by a meeting app running on the remote participant devices.

7. The method of any of examples 1-6 wherein the spreadsheet includes a cloud-based collaborative spreadsheet.

8. The method of any of examples 1-7 and further including receiving a selection of a storyboard function in a spreadsheet, receiving multiple markings of ranges of cells in the spreadsheet via the storyboard function, and persisting the multiple markings in a presentation flow.

9. The method of example 8 and further including displaying a representation of the presentation flow as multiple selectable marked ranges of cells, receiving a selection of a first one of the multiple selectable marked ranges of cells, and displaying a presentable version of the first one of the multiple selectable marked ranges of cells.

10. The method of example 9 wherein the first one of the multiple selectable marked ranges of cells comprises any one of the multiple selectable marked ranges of cells.

11. The method of any of examples 9-10 wherein presentable version of the first one of the multiple marked selectable marked ranges is zoomed to fit a window.

12. The method of any of examples 9-11 wherein the presentation flow comprises thumbnail images of the multiple markings of ranges of cells arranged next to each other and wherein the thumbnail images are selectable to display the corresponding ranges of cells.

13. The method of any of examples 9-12 and further comprising providing a zoom level for each remote device for display of the shared screen that is shared with remote participant devices, wherein the zoom level is based on remote device screen size and resolution, context of the sharer/presenter and readability.

14. The method of any of examples 1-13 wherein the spreadsheet is accessed via a meeting app hosting a spreadsheet application on the computer.

15. A machine-readable storage device having instructions for execution by a processor of a machine to cause the processor to perform operations to perform any of the methods of examples 1-14.

16. A device includes a processor and a memory device coupled to the processor and having a program stored thereon for execution by the processor to perform operations to perform any of the methods of examples 1-14.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
accessing a spreadsheet for display on a display screen during a remote meeting;
receiving a first selection to execute a spotlight function;
receiving a second selection of a portion of the spreadsheet being displayed;
creating an overlay via the spotlight function, the overlay having a transparent cavity corresponding to the selected portion of the spreadsheet; and
applying the overlay to the spreadsheet being displayed such that the selected portion is visible and other portions of the spreadsheet are obscured.

2. The method of claim 1 wherein the overlay is applied using scalable vector graphic layering.

3. The method of claim 1 wherein a portion of the overlay outside the transparent cavity is semitransparent.

4. The method of claim 1 wherein a portion of the overlay outside the cavity is opaque.

5. The method of claim 1 and further comprising rotating the applied overlay and spreadsheet being displayed.

6. The method of claim 1 and further comprising sharing the spreadsheet during the remote meeting with remote participant devices, the remote participant devices accessing and displaying the shared spreadsheet via a spreadsheet application being hosted by a meeting app running on the remote participant devices.

7. The method of claim 1 wherein the spreadsheet comprises a cloud-based collaborative spreadsheet.

8. The method of claim 1 and further comprising:
receiving a selection of a storyboard function in a spreadsheet;
receiving multiple markings of ranges of cells in the spreadsheet via the storyboard function; and
persisting the multiple markings in a presentation flow.

9. The method of claim 8 and further comprising:
displaying a representation of the presentation flow as multiple selectable marked ranges of cells;
receiving a selection of a first one of the multiple selectable marked ranges of cells; and
displaying a presentable version of the first one of the multiple selectable marked ranges of cells.

10. The method of claim 9 wherein the first one of the multiple selectable marked ranges of cells comprises any one of the multiple selectable marked ranges of cells.

11. The method of claim 9 wherein presentable version of the first one of the multiple marked selectable marked ranges is zoomed to fit a window.

12. The method of claim 9 wherein the presentation flow comprises thumbnail images of the multiple markings of ranges of cells arranged next to each other and wherein the thumbnail images are selectable to display the corresponding ranges of cells.

13. The method of claim 9 and further comprising providing a zoom level for each remote device for display of the shared screen that is shared with remote participant devices, wherein the zoom level is based on remote device screen size and resolution, context of the sharer/presenter and readability.

14. The method of claim 1 wherein the spreadsheet is accessed via a meeting app hosting a spreadsheet application on the computer.

15. A machine readable storage device having instructions for execution by a processor of a machine to cause the processor to perform operations to perform a method, the operations comprising:
accessing a spreadsheet for display on a display screen during a remote meeting;
receiving a first selection to execute a spotlight function;
receiving a second selection of a portion of the spreadsheet being displayed;
creating an overlay via the spotlight function, the overlay having a transparent cavity corresponding to the selected portion of the spreadsheet; and
applying the overlay to the spreadsheet being displayed such that the selected portion is visible and other portions of the spreadsheet are obscured.

16. The device of claim 15 wherein the overlay is applied using scalable vector graphic layering.

17. The device of claim 15 wherein the operations further comprise sharing the spreadsheet during the remote meeting with remote participant devices, the remote participant devices accessing and displaying the shared spreadsheet via a spreadsheet application being hosted by a meeting app running on the remote participant devices.

18. The device of claim 15 wherein the operations further comprise:
receiving a selection of a storyboard function in a spreadsheet;
receiving multiple markings of ranges of cells in the spreadsheet via the storyboard function; persisting the multiple markings in a presentation flow;
displaying a representation of the presentation flow as multiple selectable marked ranges of cells;
receiving a selection of a first one of the multiple selectable marked ranges of cells; and
displaying a presentable version of the first one of the multiple selectable marked ranges of cells.

19. The device of claim 18 wherein the presentation flow comprises thumbnail images of the multiple markings of ranges of cells arranged next to each other and wherein the thumbnail images are selectable to display the corresponding ranges of cells and wherein the operation further comprise providing a zoom level for each remote device for display of the shared screen that is shared with remote participant devices, wherein the zoom level is based on remote device screen size and resolution, context of the sharer/presenter and readability.

20. A device comprising:
a processor; and
a memory device coupled to the processor and having a program stored thereon for execution by the processor to perform operations comprising:
accessing a spreadsheet for display on a display screen during a remote meeting;
receiving a first selection to execute a spotlight function;
receiving a second selection of a portion of the spreadsheet being displayed;
creating an overlay via the spotlight function, the overlay having a transparent cavity corresponding to the selected portion of the spreadsheet; and
applying the overlay to the spreadsheet being displayed such that the selected portion is visible and other portions of the spreadsheet are obscured.

\* \* \* \* \*